US010255454B2

(12) United States Patent
Kamara et al.

(10) Patent No.: US 10,255,454 B2
(45) Date of Patent: Apr. 9, 2019

(54) CONTROLLING SECURITY IN RELATIONAL DATABASES

(71) Applicant: Microsoft Technology Licensing, LLC, Redmond, WA (US)

(72) Inventors: Seny Kamara, Seattle, WA (US); Tarik Moataz, Paris (FR)

(73) Assignee: Microsoft Technology Licensing, LLC, Redmond, WA (US)

( * ) Notice: Subject to any disclaimer, the term of this patent is extended or adjusted under 35 U.S.C. 154(b) by 432 days.

(21) Appl. No.: 15/045,251

(22) Filed: Feb. 17, 2016

(65) Prior Publication Data

US 2017/0235969 A1 Aug. 17, 2017

(51) Int. Cl.
*H04L 29/06* (2006.01)
*G06F 21/62* (2013.01)
*G06F 17/30* (2006.01)
*H04L 9/00* (2006.01)
*H04L 9/08* (2006.01)

(52) U.S. Cl.
CPC .... *G06F 21/6227* (2013.01); *G06F 17/30595* (2013.01); *G06F 21/6218* (2013.01); *H04L 9/008* (2013.01); *H04L 9/0894* (2013.01); *H04L 63/0807* (2013.01); *G06F 2221/2107* (2013.01)

(58) Field of Classification Search
CPC ........... G06F 21/6227; G06F 17/30595; G06F 21/6218; G06F 2221/2107; H04L 9/008; H04L 63/0807; H04L 9/0894
See application file for complete search history.

(56) References Cited

U.S. PATENT DOCUMENTS

| 7,269,729 B2 | 9/2007 | He et al. |
| 7,325,129 B1 | 1/2008 | Mattsson et al. |
| 7,353,387 B2 | 4/2008 | Benfield et al. |

(Continued)

OTHER PUBLICATIONS

Wei Zhao, Feng Gao2, Danfeng Zhao1, Guohua Liu1, "A tuple-oriented bucket partition index with minimum weighted mean of interferential numbers for DAS models", College of Information Science and Engineering Yanshan University, College of computer science Fudan Univerity, IEEE, 2010, 978-1-4244-5586-7, pp. 688-693.*

(Continued)

*Primary Examiner* — Joseph P Hirl
*Assistant Examiner* — Chi D Nguy
(74) *Attorney, Agent, or Firm* — Rainier Patents, P.S.

(57) ABSTRACT

A security controller controls secure processing of queries in an encrypted relational database. A query controller receives, from a client device, a secure query in a format of an encrypted token generated using a structured query language (SQL) query in a conjunctive query form, and sends an encrypted response to the secure query to the client device. A search engine generates the encrypted response to the secure query by initiating a search on the encrypted relational database, without decrypting the secure query and without decrypting the encrypted multi-maps. The encrypted relational database includes encrypted multi-maps corresponding to a relational database hosted at the client device, and an encrypted dictionary, based on structured encryption, using structured encryption, in lieu of using property-preserving encryption (PPE), and in lieu of using fully homomorphic encryption (FHE).

21 Claims, 16 Drawing Sheets

(56) References Cited

U.S. PATENT DOCUMENTS

| | | | |
|---|---|---|---|
| 7,418,098 | B1 | 8/2008 | Mattsson et al. |
| 7,500,111 | B2 | 3/2009 | Hacigumus et al. |
| 7,797,342 | B2 | 9/2010 | Banks et al. |
| 7,827,403 | B2 | 11/2010 | Wong et al. |
| 8,165,305 | B2 | 4/2012 | Chrysler et al. |
| 8,806,223 | B2 | 8/2014 | Crowe |
| 8,938,067 | B2 | 1/2015 | Martin et al. |
| 8,949,625 | B2 | 2/2015 | Spies et al. |
| 9,100,183 | B2 | 8/2015 | Movshovitz |
| 2012/0159180 | A1* | 6/2012 | Chase .............. G06F 21/6227 713/183 |
| 2015/0039885 | A1 | 2/2015 | Cash et al. |

OTHER PUBLICATIONS

International Search Report and Written Opinion dated Mar. 29, 2017 from PCT Patent Application No. PCT/US2017/017085, 15 pages.

Bösch et al., "A Survey of Provably Secure Searchable Encryption", ACM Computing Surveys, vol. 47, No. 2, Aug. 25, 2014, pp. 1-51, 51 pages.

"Second Written Opinion issued in PCT Application No. PCT/US2017/017085", dated Dec. 22, 2017, 7 Pages.

Vimercati, et al., "On Information Leakage by Indexes over Data Fragments", In Proceedings of IEEE 29th International Conference on Data Engineering Workshops, Apr. 8, 2013, pp. 95-98.

Wang, et al., "Secure Ranked Keyword Search over Encrypted Cloud Data", In Proceedings of IEEE 30th International Conference on Distributed Computing Systems, Jun. 21, 2010, 10 pages.

Agrawal, et al., "Order preserving encryption for numeric data", In Proceedings of the ACM SIGMOD international conference on Management of data, Jun. 13, 2004, 12 pages.

Arasu, et al., "Orthogonal Security with Cipherbase", In Proceedings of 6th Biennial Conference on Innovative Data Systems Research, Jan. 6, 2013, 10 pages.

Bellare, et al., "Deterministic and Efficiently Searchable Encryption", In Proceedings of 27th Annual International Cryptology Conference on Advances in cryptology, Aug. 19, 2007, pp. 1-43.

Ben-David, et al., "FairplayMP: A system for secure multi-party computation", In Proceedings of the 15th ACM conference on Computer and communications security, Oct. 27, 2008, pp. 257-266.

Boldyreva, et al., "Order-Preserving Symmetric Encryption", In Proceedings of 28th Annual International Conference on the Theory and Applications of Cryptographic Techniques, Apr. 26, 2009, pp. 1-24.

Boneh, et al., "Public key encryption with keyword search", In Proceedings of International Conference on the Theory and Applications of Cryptographic Techniques, May 2, 2004, pp. 1-15.

Cash, et al., "Dynamic searchable encryption in very-large databases: Data structures and implementation", In Proceedings of 21st Annual Network and Distributed System Security Symposium, Feb. 23, 2014, pp. 1-16.

Cash, et al., "Highly-Scalable Searchable Symmetric Encryption with Support for Boolean Queries", In Proceedings of 33rd Annual Cryptology Conference, Aug. 18, 2013, pp. 1-21.

Cash, et al., "The Locality of Searchable Symmetric Encryption", In Proceedings of 33rd Annual International Conference on the Theory and Applications of Cryptographic Techniques, May 11, 2014, pp. 1-22.

Chamberlin, et al., "SEQUEL: A structured English query language", In Proceedings of the ACM SIGFIDET workshop on Data description, access and control, May 1, 1974, pp. 249-264.

Chandra, et al., "Optimal implementation of conjunctive queries in relational data bases", In Proceedings of the ninth annual ACM symposium on Theory of computing, May 4, 1977, pp. 77-90.

Chase, et al., "Structured encryption and controlled disclosure", In Proceedings of 16th International Conference on the Theory and Application of Cryptology and Information Security, Dec. 5, 2010, pp. 577-594.

Chase, et al., "Structured encryption and controlled disclosure", In Journal of IACR Cryptology ePrint Archive, vol. 2011, Retrieved on: Oct. 27, 2015, pp. 1-25.

Codd, E. F., "A relational model of data for large shared data banks", In Magazine Communications of the ACM, vol. 13, Issue 6, Jun. 1970, pp. 377-387.

Curtmola, et al., "Searchable symmetric encryption: improved definitions and efficient constructions", In Proceedings of the 13th ACM conference on Computer and communications security, Oct. 30, 2006, pp. 79-88.

Faber, et al., "Rich queries on encrypted data: Beyond exact matches", In Proceedings of 20th European Symposium on Research in Computer Security, Part II, Sep. 21, 2015, pp. 1-22.

Gentry, Craig., "A fully homomorphic encryption scheme", In PhD Thesis, Stanford University, Sep. 2009, 209 pages.

Goldreich, et al., "Software protection and simulation on oblivious RAMs", In Journal of the ACM, vol. 43, Issue 3, May 1996, pp. 431-473.

Grofig, et al., "Experiences and observations on the industrial implementation of a system to search over outsourced encrypted data", In the Proceedings of the 7th Annual Meeting of the Department of Security of the society for computer science, Mar. 19, 2014, 11 pages.

Hacigumus, et al., "Executing SQL over encrypted data in the database-service-provider model", In Proceedings of the ACM SIGMOD international conference on Management of data, Jun. 4, 2002, pp. 216-227.

Jarecki, et al., "Outsourced Symmetric Private Information Retrieval", In Proceedings of ACM SIGSAC Conference on Computer & Communications Security, Nov. 4, 2013, pp. 875-887.

Kamara, et al., "Parallel and Dynamic Searchable Symmetric Encryption", In Proceedings of 17th International Conference for Financial Cryptography and Data Security, Apr. 1, 2013, 17 pages.

Kamara, et al., "Dynamic Searchable Symmetric Encryption", In Proceedings of ACM Conference on Computer and Communications Security, Oct. 16, 2012, pp. 965-976.

Kurosawa, et al., "UC-Secure Searchable Symmetric Encryption", In Proceedings of 16th International Conference for Financial Cryptography and Data Security, Feb. 27, 2012, 14 pages.

Meng, et al., "GRECS: Graph Encryption for Approximate Shortest Distance Queries", In Proceedings of the 22nd ACM SIGSAC Conference on Computer and Communications Security, Oct. 12, 2015, pp. 504-517.

Naveed, et al., "Inference Attacks on Property-Preserving Encrypted Databases", In Proceedings of the 22nd ACM SIGSAC Conference on Computer and Communications Security, Oct. 12, 2015, 13 pages.

Naveed, et al., "Dynamic Searchable Encryption via Blind Storage", In IEEE Symposium on Security and Privacy, May 18, 2014, pp. 639-654.

Pappas, et al., "Blind Seer: A Scalable Private DBMS", In IEEE Symposium on Security and Privacy, May 18, 2014, 16 pages.

Popa, et al., "CryptDB: Protecting Confidentiality with Encrypted Query Processing", In Proceedings of the Twenty-Third ACM Symposium on Operating Systems Principles, Oct. 23, 2011, pp. 85-100.

Song, et al., "Practical Techniques for Searches on Encrypted Data", In Proceedings of IEEE Symposium on Security and Privacy, May 14, 2000, 12 pages.

Bussche, et al., "Translating SQL into the Relational Algebra", Retrieved on: Oct. 27, 2015 Available at: http://cs.ulb.ac.be/public/_media/teaching/infoh417/sql2alg_eng.pdf.

Demand filed Jun. 19, 2017 with Response to the International Search Report and Written Opinion dated Mar. 29, 2017 from PCT Patent Application No. PCT/US2017/017085, 12 pages.

* cited by examiner

200A

$\Sigma_{DX}$ = (Setup, Token, Get) is a response-revealing dictionary encryption scheme $\Sigma_{MM}$ = (Setup, Token, Get) is a response-revealing multi-map encryption scheme SKE = (Gen, Enc, Dec) is a symmetric-key encryption scheme DB encryption scheme SPX = (Setup, Token, Query, Dec) is defined as:

Setup($1^k$, DB):

1. initialize a dictionary DX;
2. initialize multi-maps $MM_R$, $MM_C$ and $MM_V$;
3. initialize multi-maps $(MM_a)_{a \in \mathbb{S}(DB)}$;
4. for all $\mathbf{r} \in$ DB set $MM_R [\langle tbl(\mathbf{r}), rrk(\mathbf{r}) \rangle]$ :=

$(Enc_{K_1}(r_1), ..., Enc_{K_1}(r_{\#r}), tbl(\mathbf{r}), rrk(\mathbf{r}))$;

5. compute $(K_R, EMM_R) \leftarrow \Sigma_{MM}.Setup(1^k, MM_R)$;
6. for all $\mathbf{c} \in DB^T$, set $MM_C [\langle tbl(\mathbf{c}), crk(\mathbf{c}) \rangle]$ :=

$(Enc_{K_1}(c_1), ..., Enc_{K_1}(c_{\#c}), tbl(\mathbf{c}), crk(\mathbf{c}))$;

7. compute $(K_C, EMM_C) \leftarrow \Sigma_{MM}.Setup(1^k, MM_C)$;
8. for all $\mathbf{c} \in DB^T$, (a) for all $v \in \mathbf{c}$ and $\mathbf{r} \in DB_{\mathbf{c}=v}$, i. compute $rtk_\mathbf{r} \leftarrow \Sigma_{MM}.Token_{K_R}(\langle tbl(\mathbf{r}), rrk(\mathbf{r}) \rangle)$, (b) set $MM_V [\langle v, \langle tbl(att(\mathbf{c})), crk(att(\mathbf{c})) \rangle \rangle]$ := $(rtk_\mathbf{r})_{\mathbf{r} \in DB_{\mathbf{c}=v}}$;

9. compute $(K_V, EMM_V) \leftarrow \Sigma_{MM}.Setup(1^k, MM_V)$;

214 — 10. for all $c \in DB^T$,
    (a) for all $c' \in DB^T$ such that $dom(att(c')) = dom(att(c))$,
        i. initialize an empty tuple $t$;
        ii. for all $i, j \in [m]$ such that $c[i] = c'[j]$,
            A. compute $rtk_i \leftarrow \Sigma_{MM}.\text{Token}_{K_R}(\langle tbl(c), i \rangle)$;
            B. compute $rtk_j \leftarrow \Sigma_{MM}.\text{Token}_{K_R}(\langle tbl(c'), j \rangle)$;
            C. add $(rtk_i, rtk_j)$ to $t$;
        iii. set
            $MM_C[\langle\langle tbl(c), crk(c)\rangle, \langle tbl(c'), crk(c')\rangle\rangle] := t$;

216 — (b) compute $(K_c, EMM_c) \leftarrow \Sigma_{MM}.\text{Setup}(1^k, MM_c)$;
218 — (c) set $DX[\langle tbl(c), crk(c)\rangle] = EMM_c$;
220 — 11. compute $(K_D, EDX) \leftarrow \Sigma_{DX}.\text{Setup}(1^k, DX)$;
222 — 12. output $K = (K_R, K_C, K_V, K_D, \{K_c\}_{c \in DB^T})$ and
        $EDB = (EMM_R, EMM_C, EMM_V, EDX)$;

FIG. 2B

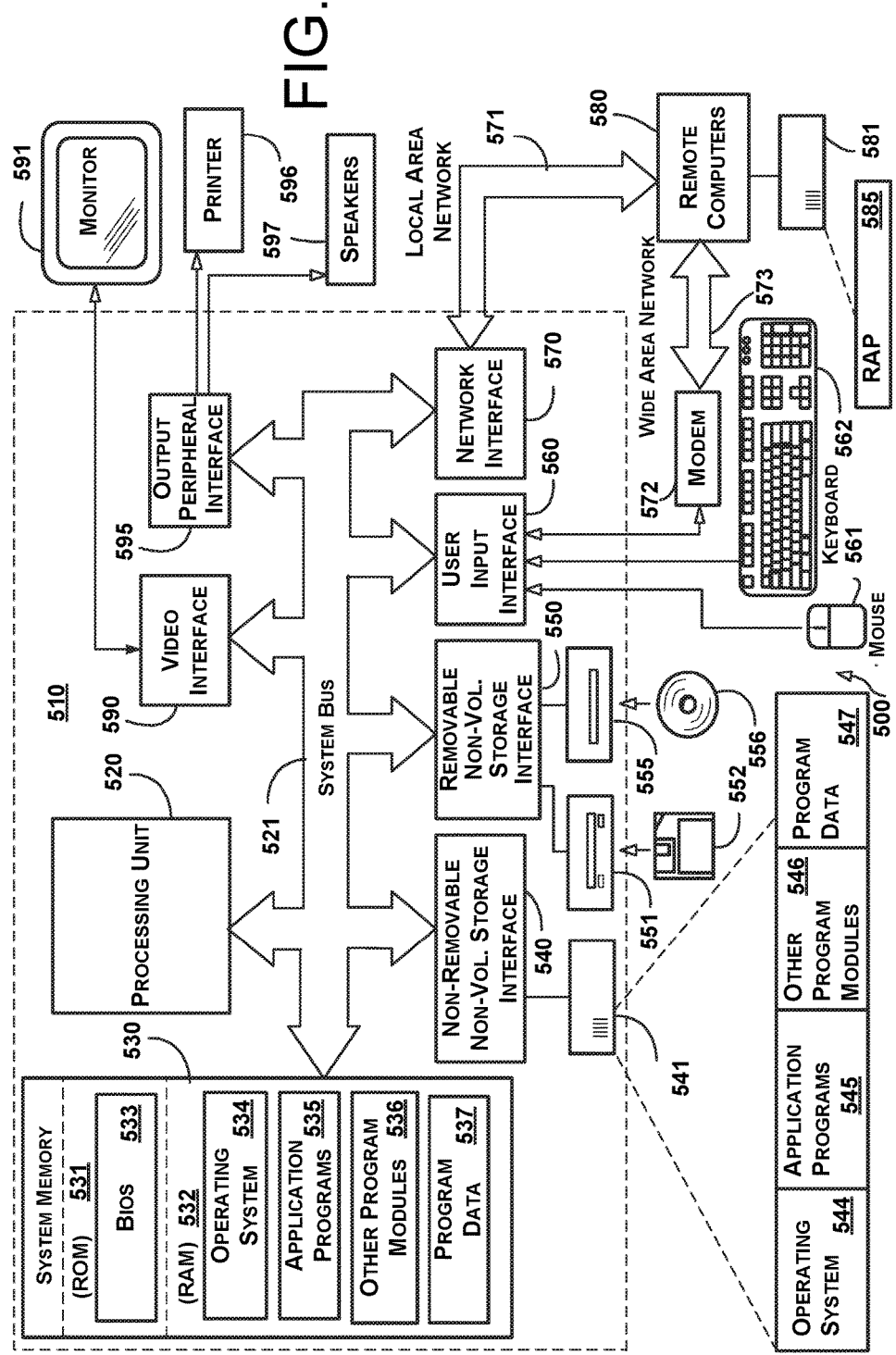

700B

712 — Receive, at a server device, the encrypted database, from the client device

714 — Sending the encrypted response to the client device includes sending an encrypted table to the client device

716 — Generating the encrypted response to the secure query includes generating the encrypted response without decrypting the secure query and without decrypting the encrypted database

718 — The encrypted multi-maps include a row-wise multi-map that stores a row-wise representation of the relational database in encrypted form

720 — The encrypted multi-maps include a column-wise multi-map that stores a column-wise representation of the relational database in encrypted form

722 — The encrypted multi-maps include a value-wise multi-map that stores a value-wise representation of the relational database in encrypted form, the value-wise representation representing mappings of values of cells to rows in the relational database that store respective values in common with the respective cells

FIG. 7C

CONTROLLING SECURITY IN RELATIONAL DATABASES

BACKGROUND

Users of electronic devices frequently need to access database systems to obtain various types of information and/or perform various operations. Many different techniques have been devised for controlling storage and retrieval of data items in database management systems (DBMSs). Confidentiality of data in database management systems is an ongoing concern, as owners of data may prefer that their information is protected from being observed/used by others. As an example, concerns over data security and data breaches may hinder the adoption of cloud technologies. Data may be a valuable asset and unprotected data in the cloud may be vulnerable to hackers and/or snooping administrators.

SUMMARY

According to one general aspect, a system may include at least one hardware device processor, and a computer-readable storage medium storing executable instructions that, when executed, cause one or more of the at least one hardware device processor to control secure processing of queries in a relational database by generating a secure query based on generating an encrypted token using a structured query language (SQL) query in a conjunctive query form, using structured encryption, in lieu of using property-preserving encryption (PPE). The encrypted token includes an arity value indicating a cardinality of tables included in a cross product portion of the query and a dimension value indicating dimensions of the tables included in the cross product. The secure query is submitted to a device that hosts an encrypted database that comprises encrypted multi-maps corresponding to the relational database, and an encrypted dictionary based on structured encryption. An encrypted response to the secure query is received.

According to another aspect, secure processing of queries in a relational database is controlled by receiving, from a client device, a secure query in a format of an encrypted token generated using a structured query language (SQL) query in a conjunctive query form, the encrypted token including an arity value indicating a cardinality of tables included in a cross product portion of the query and a dimension value indicating dimensions of the tables included in the cross product. An encrypted response to the secure query is generated using an encrypted database that comprises encrypted multi-maps corresponding to the relational database and an encrypted dictionary based on structured encryption, using structured encryption, in lieu of using property-preserving encryption (PPE), and in lieu of using fully homomorphic encryption (FHE). The encrypted response is sent to the client device.

According to another aspect, a system may include at least one server that includes at least one hardware device processor. The server may include an encrypted relational database that includes encrypted multi-maps corresponding to a relational database hosted at a client device, and an encrypted dictionary, based on structured encryption, using structured encryption, in lieu of using property-preserving encryption (PPE), and in lieu of using fully homomorphic encryption (FHE). A security controller may include a computer-readable storage medium storing executable instructions that, when executed, cause the hardware device processor to control secure processing of queries in the encrypted relational database. The security controller includes a query controller that receives, from the client device, a secure query in a format of an encrypted token generated using a structured query language (SQL) query in a conjunctive query form, and sends an encrypted response to the secure query to the client device. The query controller includes a search engine that generates the encrypted response to the secure query by initiating a search on the encrypted relational database, without decrypting the secure query and without decrypting the encrypted multi-maps.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIGS. 2A-2B illustrate an example Setup technique for an example structured encryption scheme for selection, projection and Cartesian product (SPC) queries on relational databases.

FIG. 5 is a block diagram of an example architecture for an example system for controlling security in an encrypted database management system.

FIGS. 7A-7C are a flowchart illustrating example operations of the system of FIG. 5.

DETAILED DESCRIPTION

I. Introduction

Figure 1:
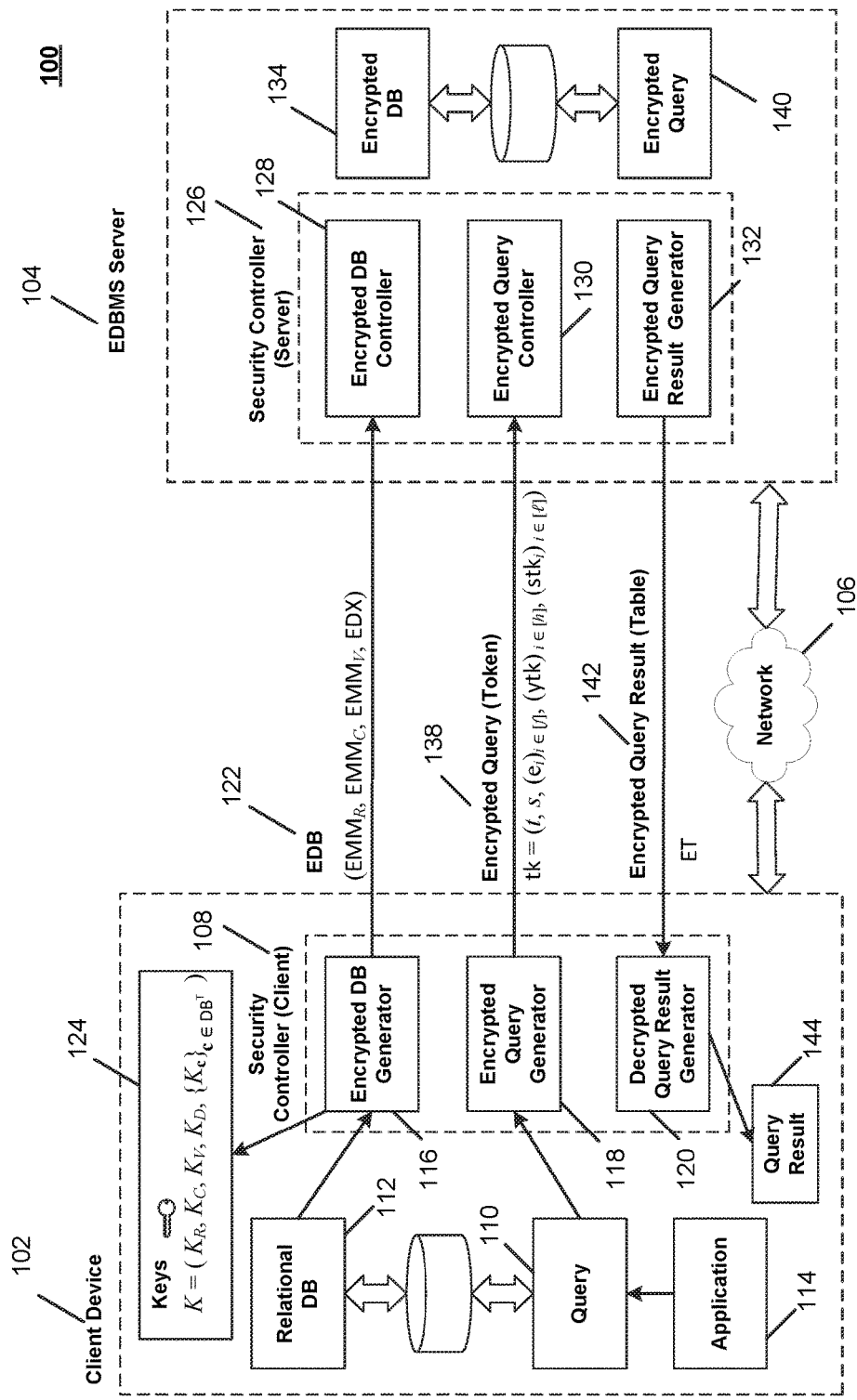
FIG. 1 is a block diagram of an example architecture for controlling security of data in an encrypted database management system.

Recent developments in hardware platforms have exploited various processors, and various storage devices, in efforts to provide higher performance (e.g., speed, efficiency) and more secure processing of confidential data. Confidentiality of data in database management systems is an ongoing concern. As an example, concerns over data security and data breaches may hinder the adoption of cloud technologies. Data may be a valuable asset and unprotected data in the cloud may be vulnerable to hackers and/or snooping administrators. Thus, it may be advantageous to provide database management systems (DBMSs) that can guarantee strong data confidentiality, where an adversary cannot learn information about the data. For example, such a DBMS may address security vulnerabilities and possibly spawn new opportunities in cloud database-as-a-service.

Example techniques discussed herein may encrypt a relational database in such a way that it can support conjunctive queries, which may be a particular class of Structured Query Language (SQL) queries. Conventional attempts to solve this problem may have relied on a type of encryption referred to as property-preserving encryption (PPE), such as, for example, deterministic and order-preserving encryption. Such PPE-based approaches may leak a substantial amount of information. Example techniques discussed herein, on the other hand, may leak substantially less information.

Another approach may use trusted hardware; however, the user may then need to trust the hardware. Example techniques discussed herein may not require using trusted hardware (i.e., may be performed on untrusted hardware, with no trusted hardware for the example specific systems discussed herein).

Example techniques discussed herein may encrypt a relational database such that it may efficiently support a large class of SQL queries. Example techniques discussed herein may be based solely on structured encryption, without making use of any property-preserving encryption (PPE) schemes such as deterministic and order-preserving encryption. As such, example techniques discussed herein may leak substantially less than PPE-based solutions such as CRYPTDB and CIPHERBASE which have recently been shown to potentially reveal substantial information in certain settings (see, e.g., Naveed et al., "Inference Attacks on Property-Preserving Encrypted Databases," In *Proceedings of the 22nd ACM SIGSAC Conference on Computer and Communications Security*, Oct. 12, 2015).

The problem of encrypted search has received substantial attention from industry, academia and government due to its potential applications to cloud computing and database security. Most of the progress in this area, however, has been in the setting of keyword search on encrypted documents. While this may have many applications in practice (e.g., email, NoSQL databases, desktop search engines, cloud document storage), much of the data produced and consumed in practice may be stored and processed in relational databases. A relational database may be, roughly speaking, a set of tables with rows representing entities/items and columns representing their attributes. The relational database model was proposed by Codd (see, e.g., Codd, E. F., "A relational model of data for large shared data banks," In *Communications of the ACM*, Vol. 13, Issue 6, 1970, pp. 377-387), and many relational databases (DBs) are queried using the structured query language (SQL) which is a special-purpose declarative language introduced by Chamberlain and Boyce (see, e.g., Chamberlin, et al., "SEQUEL: A structured English query language," In *Proceedings of the ACM SIGFIDET Workshop on Data Description, Access and Control*, 1974, pp. 249-264).

The problem of encrypted relational DBs is a significant area of work in database security. For example, it was explicitly considered by Hacigümüs̨, Iyer, Li and Mehrotra (see, e.g., Hacigümüs̨ et al., "Executing SQL over encrypted data in the database-service-provider model," *Proceedings of the 2002 ACM SIGMOD International Conference on Management of Data* (SIGMOD '02), 2002, pp. 216-227) who described a quantization-based approach which, roughly speaking, leaks the range within which an item falls. Popa, Redfield, Zeldovich and Balakrishnan (see, e.g., Popa et al., Popa et al., "CryptDB: protecting confidentiality with encrypted query processing," In *Proceedings of the Twenty-Third ACM Symposium on Operating Systems Principles* (SOSP'11), October 2011, pp. 85-100) discuss a system called CRYPTDB that can support a non-trivial subset of SQL on encrypted relational DBs without quantization. CRYPTDB may achieve this in part by making use of property-preserving encryption (PPE) schemes like deterministic and order-preserving (OPE) encryption, which reveal equality and order, respectively. The example high-level technique replaces the plaintext operations needed to execute a SQL query (e.g., equality tests and comparisons) by substantially the same operations on PPE-encrypted ciphertexts. This approach later influenced other systems including CIPHERBASE (see, e.g., Arasu et al., "Orthogonal Security with Cipherbase," In *Proceedings of 6th Biennial Conference on Innovative Data Systems Research*, 2013) and SEEED (see, e.g., Grofig et al, "Experiences and observations on the industrial implementation of a system to search over outsourced encrypted data," In *Proceedings of the 7th Annual Meeting of the Department of Security of the Society for Computer Science*, Mar. 19, 2014). While this may lead to systems that are efficient and legacy-friendly, it was recently shown by Naveed, Kamara and Wright (see, e.g., Naveed et al., "Inference Attacks on Property-Preserving Encrypted Databases," In *Proceedings of the 22nd ACM SIGSAC Conference on Computer and Communications Security*, Oct. 12, 2015), that such PPE-based EDB systems may leak a substantial amount of information when used in settings such as, for example, electronic medical records (EMRs). In light of this result, a potential issue in encrypted search and, more generally, in database security, is determining whether it may be possible to efficiently execute SQL queries on encrypted relational DBs without making use of PPE and with a "reasonable" amount of leakage—or at least, with less leakage than the PPE-based solutions.

Example techniques discussed herein may address (at least) this problem and may provide an example solution for SQL on encrypted DBs that does not make use of PPE and that may leak substantially less than most conventional approaches. Example techniques discussed herein may be efficient and may handle a large sub-class of SQL queries and an even larger class if a small amount of post-processing at the client is allowed. More particularly, example techniques discussed herein may handle a class of conjunctive queries (see, e.g., Chase, et al., "Structured encryption and controlled disclosure," In *Proceedings of 16th International Conference on the Theory and Application of Cryptology and Information Security*, 2010, pp. 577-594) which may correspond to SQL queries of the form Select attributes From tables Where $(a_1 = {}_1 \wedge \ldots \wedge X_\ell = X_{\ell'})$, where $a_1$ through $a_\ell$ are attributes in the DB schema and $X_1$ through $X_n$ are either attributes or constants. While the class of conjunctive queries is smaller than the class supported by the PPE-based solutions, it may rank among the most studied and useful classes of queries. Furthermore, as mentioned above, if one allows for a small amount of post-processing at the client, the expressiveness of example techniques discussed herein may be extended to a substantially wider sub-class.

Generally, the PPE-based approach to encrypted databases (EDBs) may be viewed as replacing the plaintext execution of a SQL query with an encrypted execution of the query by executing the server's low-level operations (i.e., comparisons and equality tests) directly on the encrypted cells. This may be done due to the properties or PPE which guarantee that operations on plaintexts can be done on ciphertexts as well. This "plug-and-play" type of approach may make the design of EDBs relatively straightforward since the only requirement may be to replace plaintext cells with PPE-encrypted cells. Given the complexity of relational DBs and of SQL queries it may not be a-priori clear how to resolve this without PPE or without resorting to general-purpose solutions such as, for example, fully-homomorphic encryption (FHE) or oblivious RAM (ORAM).

An example first step towards a solution may involve isolating some of the conceptual difficulties of the problem. For example, relational DBs may seem relatively simple from a data structure perspective since they may comprise a set of two-dimensional arrays. However, an example high-level challenge may stem from SQL and, more particularly, from its complexity (e.g., it can express first-order logic) and from its declarative nature. To overcome this, a simpler but widely applicable and well-studied subset of SQL queries (see above) may be used and a more procedural view of SQL may be taken. For example, the relational algebra formulation of SQL, which may be more amenable to cryptographic techniques, may be used. The relational algebra was introduced by Codd (see, e.g., Codd, E. F., "A relational model of data for large shared data banks," *Communications of the ACM*, Vol. 13, Issue 6, 1970, pp. 377-387) as an example technique for formalizing queries on relational databases. Generally, it may comprise the queries that can be expressed from a set of basic operations. It was later shown by Chandra and Merlin (see, e.g., Chandra, et al., "Optimal implementation of conjunctive queries in relational data bases," In *Proceedings of the Ninth Annual ACM Symposium on Theory of Computing*, 1977, pp. 77-90) that three of these operations (selection, projection and cross product) may capture a large class of useful queries called "conjunctive queries" that may have advantageous theoretical properties.

The subset of the relational algebra expressed by the selection, projection and Cartesian product (e.g., cross product) operators may also be referred to herein as the "SPC algebra." By working in the SPC algebra, it may be possible to not only obtain a procedural representation of SQL queries, but also to reduce the problem to handling just three basic operations. Conceptually, this may be reminiscent of the benefits that may be obtained by working with circuits in secure multi-party computation and FHE. Further, the SPC algebra admits a normal form; that is, SPC queries may be written in a standard form. By working with this normal form, it may be possible (as with other general-purpose solutions) to design and analyze a single construction that handles all SPC queries. However, somewhat similarly to circuit representations, the SPC normal form may not always be the most efficient.

As mentioned above, the SPC algebra comprises queries that can be expressed by a combination of the select, project and cross product operators which, at a high-level, may work as discussed below.

For example, the select operator $\sigma_\psi$ may take as input a table T and output the rows of T that satisfy a predicate $\psi$. For example, the project operator $\pi_{a_1, \ldots, a_h}$ may take as input a table T and output the columns of T indexed by $a_1, \ldots, a_h$. Further, the cross product operator $T_1 \times T_2$ may take two tables as input and output a third table comprising rows in the Cartesian product of $T_1$ and $T_2$ when viewed as sets of rows. For example, an SPC query in normal form over a database $DB = (T_1, \ldots, T_n)$ may be denoted:

$$\pi_{a_1, \ldots, a_h}([\alpha_1] \times [\alpha_j] \times \sigma_\psi(T_{i_1} \times \ldots \times T_{i_t})),$$

where $\psi$ is of the form $a_1 = X_1 \wedge \ldots \wedge a_\ell = X_\ell$ where $a_1, \ldots, a_\ell$ are attributes in the schema of DB and $X_1, \ldots, X_\ell$ are either attributes or constants. So, concretely, the problem may be reduced to the problem of encrypting a relational database $DB = (T_1, \ldots, T_n)$ in such a way that it can support SPC queries in normal form.

The concrete problem stated above is a structured encryption problem: namely, how can a data structure (i.e., DB) be encrypted such that it can support a specific type of query (i.e., SPC normal form queries). Structured encryption (STE) is a generalization of searchable symmetric encryption (SSE) introduced by Chase and Kamara (see, e.g., Chase, et al., supra) which allows a client to encrypt a data structure so that it can be privately queried. As discussed above, relational DBs may be relatively simple structures (i.e., two-dimensional arrays) but the queries they support may be complex. This may be in opposition to many STE schemes which may handle relatively complex structures such as dictionaries, multi-maps (i.e., inverted indexes), trees, graphs, and web graphs, but which may support relatively simple queries. For example, a potential issue in the case of relational DBs, and in handling SPC queries, is that queries may be considered constructive in the sense that they may produce new data structures from the original base structure. Intuitively, handling constructive queries (without interaction) may be challenging because the intermediate and final structures that are created by the server to answer the query may be dependent on the query and, therefore, may not be constructed by the client in the setup/pre-processing phase.

An example observation about relational DBs that may underlie example techniques discussed herein, however, is that while SPC queries may be constructive, they may not be arbitrarily so. In other words, the tables for answering an SPC query may not be completely arbitrary but may be structured in a way that can be predicted at setup. What may be query-dependent is the content of these tables but, all of that content may be already stored in the original database. Thus, the server may need to be provided with the means to construct the appropriate intermediate and final tables and to design encrypted structures that will allow it to efficiently find the (encrypted) content it needs to populate those tables.

Upon inspection of the SPC normal form, it may be noted that the first intermediate table needed to answer a query may be the cross product $T' = T_{i_1} \times \ldots \times T_{i_t}$. Ignoring the cross products with $[\alpha_1], \ldots, [\alpha_j]$ for ease of exposition, the remaining intermediate tables as well as the final table may be "sub-tables" of T' that result from selecting a subset of rows (according to x) and keeping a subset of columns (according to $a_1, \ldots, a_h$). As discussed further below, from only t and the dimensions of $T_{i_1}$ through $T_{i_t}$, it may be possible to derive not only the dimensions of T' but also a map $\Lambda$ that maps any cell in DB to its location in T'. This map may be referred to herein as the "location map," which may be provided to the server so that it can place the encrypted content in T'. To help the server find the needed content in the first place, a set of encrypted structures may be generated which, roughly speaking, may be viewed as different representations of the database. For example, one of the encrypted structures that may be generated may provide a row-wise representation of the database, whereas another one may provide a column-wise representation. By using these various representations and by "combining" them in an appropriate manner, tokens may be generated for the server to recover the (encrypted) database cells that result from applying the select and projection operators to T'. Once the server can recover those encrypted cells it can place them in T' using the location map and prune T' to produce the final table. Moreover, throughout this process, there may be no need to perform an actual cross product since the location map implicitly simulates it in such a way that only a sub-table may be selected from T'.

As used herein, the set of all binary strings of length n may be denoted as $\{0, 1\}^n$, and the set of all finite binary strings as $\{0, 1\}^*$. As used herein, [n] may denote the set of integers $\{1, \ldots, n\}$. As used herein, $x \leftarrow \chi$ may be used to represent an element x being sampled from a distribution $\chi$ and $x \xleftarrow{\$} X$ to represent an element x being sampled uniformly at random from a set X. As used herein, the output x of an algorithm $\mathcal{A}$ may be denoted by $x \leftarrow \mathcal{A}$. Given a sequence v of n elements, its ith element may be referred to herein as $v_i$ or v[i]. As used herein, if S is a set then #S may refer to its cardinality. If s is a string then |s| refers to its length (e.g., in bits). One skilled in the art of computing will understand that values other than "bits" may be used as well.

As used herein, a private-key encryption scheme is a set of three polynomial-time algorithms $\Pi$=(Gen, Enc, Dec) such that Gen is a probabilistic algorithm that takes a security parameter k and returns a secret key K; Enc is a probabilistic algorithm that takes a key K and a message m and returns a ciphertext c; Dec is a deterministic algorithm that takes a key K and a ciphertext c and returns m if K was the key under which c was produced. Informally, a private-key encryption scheme may be secure against chosen-plaintext attacks (CPA) if the ciphertexts it outputs do not reveal any partial information about the plaintext even to an adversary that can adaptively query an encryption oracle.

As used herein, an abstract data type may include a collection of objects together with a set of operations defined on those objects. Examples include sets, dictionaries (also known as key-value stores or associative arrays) and graphs. The operations associated with an abstract data type may fall into two categories: query operations, which return information about the objects; or update operations, which may modify the objects. If the abstract data type supports only query operations it may be referred to as being static, otherwise it may be referred to as being dynamic. Example techniques discussed herein may involve static types with a single operation.

As used herein, a data structure for a given data type may refer to a representation in some computational model (e.g., the underlying model may be referred to as "RAM") of an object of the given type. For example, the representation may be optimized to support the type's query operation as efficiently as possible. For data types that support multiple queries, the representation may be optimized to efficiently support as many queries as possible. As a concrete example, the dictionary type may be represented using various data structures depending on which queries one may want to support efficiently. For example, hash tables may support Get and Put in expected O(1) time whereas balanced binary search trees may support both operations in worst-case log(n) time. For ease of understanding and to match colloquial usage, the distinction may sometimes be blurred between data types and structures. Thus, for example, when referring to a dictionary structure or a multi-map structure what is referred to may be an unspecified instantiation of the dictionary or multi-map data type.

Several basic data types may be used herein, including arrays, dictionaries and multi-maps. For example, an array A of capacity n may store n items at locations 1 through n (or at locations 0 through n-1) and may support read and write operations. As used herein, v:=A[i] may denote reading the item at location i and A[i]:=v the operation of storing an item at location i. As used herein, a dictionary DX of capacity n may refer to a collection of n label/value pairs $\{(\ell_i, v_i)\}_{i \leq n}$ that supports get and put operations. As used herein, $v_i$:=DX[$\ell_i$] may denote getting the value associated with label $\ell_i$ and DX[$\ell_i$]:=$v_i$ may denote the operation of associating the value $v_i$ in DX with label $\ell_i$. As used herein, a multi-map MM with capacity n may refer to a collection of n label/tuple pairs $\{(l_i, t_i)\}_{i \leq n}$ and may support get and put operations. Similarly to dictionaries, $t_i$:=MM[$\ell_i$] may denote getting the tuple associated with label $\ell_i$ and MM[$\ell_i$]:=$t_i$ to denote an operation of associating the tuple $t_i$ to label $\ell_i$. Multi-maps are the abstract data type instantiated by an inverted index. In encrypted search literature multi-maps are sometimes referred to as indexes, databases or tuple-sets (T-sets). As used herein, the set of possible queries a data structure supports may be referred to as its query space and the set of its possible responses may be referred to as its response space. For some data structure DS, DS:Q→R may denote that DS has query and response spaces Q and R, respectively.

As used herein, a relational database DB=($T_1, \ldots, T_n$) may refer to a set of tables where each table $T_i$ is a two-dimensional array with rows corresponding to an entity (e.g., a customer or an employee) and columns corresponding to attributes (e.g., age, height, salary). For any given attribute, the set of all possible values that it can take may be referred to as its space (e.g., integers, booleans, strings). As used herein, a schema of a table T may refer to its set of attributes, and may be denoted as $\mathbb{S}$(T). The schema of a database DB=($T_1, \ldots, T_n$) is then the set $\mathbb{S}$(DB)=$\cup_i \mathbb{S}(T_i)$. For example, it may be assumed that the attributes in $\mathbb{S}$(DB) are unique and represented as positive integers. As used herein, a table T's number (e.g., cardinality, count) of rows may be denoted as $\|T\|_r$ and its number (e.g., cardinality, count) of columns as $\|T\|_c$.

For example, a table may be viewed as a tuple of rows, which may be denoted as r∈T. For example, a table may also be viewed as a tuple of columns, which may be denoted as c∈$T^T$. Similarly, elements may be denoted as r∈DB and c∈$DB^T$ for r∈$\cup_i T_i$ and c∈$\cup_i T_i^T$, respectively. For a row r∈$T_i$, its table identifier tbl(r) is i and its row rank rrk(r) is its position in $T_i$ when viewed as a tuple of rows. Similarly, for a column c∈$T_i^T$, its table identifier tbl(c) is i and its column rank crk(c) is its position in $T_i$ when viewed as a tuple of columns. For any row r∈DB and column c∈$DB^T$, the pairs (tbl(r), rrk(r)) and (tbl(c), crk(c)), respectively, may be referred to as their coordinates in DB. The notation r[i] and c[i] may refer to the ith element of a row r and column c, respectively. The coordinate of the jth cell in row r∈$T_i$ is the triple (i, rrk(r),j). Given a column c∈$DB^T$, its corresponding attribute may be doted by att(c). For any pair of attributes $a_1, a_2 \in \mathbb{S}$(DB) such that dom($a_1$)=dom ($a_2$), $DB_{a_1=a_2}$ may denote the set of row pairs $\{(r_1, r_2) \in DB^2: r_1[a]=r_2[a_2]\}$. For any attribute a∈$\mathbb{S}$(DB) and constant $\alpha \in \cup_{a \in \mathbb{S}_{(DB)}}$ dom(a), $DB_{a=\alpha}$ may denote the set of rows $\{r \in DB: r[a]=\alpha\}$.

In practice, relational databases may be queried using the special-purpose language SQL, introduced by Chamberlain and Boyce (see, e.g., Chamberlin, et al., "SEQUEL: A structured English query language," In *Proceedings of the ACM SIGFIDET Workshop on Data Description, Access and Control*, 1974, pp. 249-264). SQL is a declarative language and can be used to modify and query a relational DB. Informally, SQL queries may typically have the form Select attributes From tables Where condition, where attributes is a set of attributes/columns, tables is a set of tables and condition is a predicate over the rows of tables and can itself contain a nested SQL query. More complex queries may be obtained using Group-by, Order-by and aggregate operators (i.e., max, min, average etc.) but the simple form above already captures a large subset of SQL. A common class of queries on relational DBs are conjunctive queries (see, e.g., Chandra, et al., supra) which have the above form with the restriction that condition is a conjunction of equalities over attributes and constants. In particular, this means there may be no nested queries in condition. More precisely, conjunctive queries may be denoted:

Select attributes From tables Where $(a_1=X_1 \wedge \ldots \wedge a_\ell = X_\ell)$, where $a_i$ is an attribute in $\mathbb{S}(DB)$ and $X_i$ can be either an attribute or a constant.

Chandra and Merlin showed that conjunctive queries could be expressed as a subset of Codd's relational algebra, which is an imperative query language based on a set of basic operators. For example, they showed that three operators select, project and cross product were enough. The select operator $\sigma_\psi$ is parameterized with a predicate $\psi$ and may take as input a table T and output a new table T' that includes the rows of T that satisfy the predicate $\psi$.

The projection operator $\pi_{a_1, \ldots, a_h}$ is parameterized by a set of attributes $a_1, \ldots, a_h$ and may take as input a table T and output a table T' that comprises the columns of T indexed by $a_1$ through $a_n$. The cross product operator x may take as input two tables $T_1$ and $T_2$ and output a new table $T'=T_1 \times T_2$ such that each row of T' is an element of the Cartesian product between the set of rows of $T_1$ and the set of rows of $T_2$. The query language that results from any combination of select, project and cross product may be referred to as the SPC algebra, which is formalized further below.

As used herein, if $DB=(T_1, \ldots, T_n)$ is a relational database, the SPC algebra comprises any query that results from a combination of the following operators:

$T' \leftarrow \sigma_\psi (T)$: the select operator is parameterized with a predicate $\psi$ of form $a_1=X_1 \wedge \ldots \wedge a_\ell = X_\ell$, where $a_i \in \mathbb{S}(DB)$ and $X_i$ is either an attribute $x_j \in \mathbb{S}(DB)$ or a constant $\alpha$ in the domain of $a_i$. It takes as input a table $T \in DB$ and outputs a table $T'=\{r \in T : \psi(r)=1\}$, where terms of the form $a_i=x_j$ are satisfied if $r(a_i)=r(x_j)$ and terms of the form $a_i=\alpha$ are satisfied if $r(a_i)=\alpha$.

$T' \leftarrow \pi_{a_1, \ldots, a_h}(T)$: the project operator is parameterized by a set of attributes $a_1, \ldots, a_h \in \mathbb{S}(DB)$. It takes as input a table $T \in DB$ and outputs a table $T'=\{\langle r(a_1), \ldots, r(a_h)\rangle : r \in T\}$.

$T_3 \leftarrow T_1 \times T_2$: the cross product operator takes as input two tables $T_1$ and $T_2$ and outputs a table $T_3=\{\langle r, v\rangle : r \in T_1 \text{ and } v \in T_2\}$, where $\langle r, v\rangle$ is the concatenation of rows r and v.

Intuitively, the connection between conjunctive SQL queries and the SPC algebra can be seen as follows: Select may be viewed as corresponding to the projection operator, From to the cross product and Where to the (SPC) select operator.

As used herein, a query in the SPC algebra can be reduced to a normal form (e.g., "SPC normal form") using an example set of identities. For example, the normal form of an SPC query over a relational database $DB=(T_1, \ldots, T_n)$ may have the form:

$$\pi_{a_1, \ldots, a_h}([\alpha_1] \times [\alpha_f] \times \sigma_\psi(T_{i_1} \times \ldots \times T_{i_t})),$$

where $\alpha_1, \ldots, \alpha_f \in \bigcup_{a \in \mathbb{S}(DB)} \text{dom}(a)$ and $[\alpha_j]$ is the 1×1 table that holds $\alpha_j$. Here, the attributes $a_1, \ldots, a_h$ in the projection are either in $\mathbb{S}(DB)$ or refer to the columns generated by $[\alpha_1]$ through $[\alpha_h]$. In the latter case, they may be referred to herein as virtual attributes and are in $\mathbb{S}(VDB)$, where VDB is a virtual database defined as $VDB=([\alpha_1], \ldots, [\alpha_f])$.

Converting SQL queries of the above form to SPC queries has been studied, and may have substantially optimized solutions. For example, the SPC queries that result from such a translation may be "compact" in the sense that the number of projects, selects and cross products in the resulting SPC query may be substantially the same as the number of attributes, tables and conditions, respectively, in the original SQL query. In addition, the transformation of SPC queries into their normal form may also be done efficiently based on a standard set of identities and also may result in "compact" normal form queries in the sense above.

As used herein, a "location map", intuitively, maps the cell coordinates in DB to their location in the cross product $T_{i_1} \times \ldots \times T_{i_t}$. Here, the tables $T_{i_1}, \ldots, T_{i_t}$ may be assumed to all have the same number of rows m. For example, let M be a $m^t \times \Sigma_i s_i$ two-dimensional array. The location map $\Lambda_{t, m, s}$ may be parameterized by the number of tables in the cross product $t \geq 1$, the size of the tables $m \geq 1$ and a vector $s=(s_1, \ldots, s_t)$ such that $s_i=\|T_i\|_c$. For example, it may take as input the coordinates of any cell in DB and output a set of locations $(\alpha, \beta) \in [m^t] \times [\Sigma_i s_i]$ in M. Concretely, an example location map may be defined as:

$$\Lambda_{t,m,s}(z,i,j)=\{((i-1) \cdot m^{t-z}+1, j+\Sigma_{l=1}^{z-1}\|T_l\|_c), \ldots, (i \cdot m^{t-z}, j+\Sigma_{l=1}^{z-1}\|T_l\|_c)\},$$

where $z \in \{i_1, \ldots, i_t\}$, $i \in [m]$ and $j \in \|T_z\|_c$.

An example syntax and security of STE schemes are discussed below. For example, a STE scheme may encrypt data structures in such a way that they can be privately queried. There are several natural forms of structured encryption. An example original definition considered schemes that encrypt both a structure and a set of associated data items (e.g., documents, emails, user profiles etc.). In another example, structure-only schemes may only encrypt structures. Another distinction may be made between interactive and non-interactive schemes. For example, interactive schemes may produce encrypted structures that may be queried through an interactive two-party protocol, whereas non-interactive schemes may produce structures that may be queried by sending a single message, i.e, the token. One may also distinguish between response-revealing and response-hiding schemes: the former may reveal the query response to the server whereas the latter may not.

Example non-interactive structure-only schemes are discussed herein. An example construction, SPX, is response-hiding but may make use of response-revealing schemes as building blocks. As such, both forms are discussed below.

At a high level, non-interactive STE may work as discussed below.

During a setup phase, the client may construct an encrypted structure EDS under a key K from a plaintext structure DS. The client may then send EDS to the server. During the query phase, the client may construct and send a token tk generated from its query q and secret key K. The server may then use the token tk to query EDS and recover either a response r or an encryption ct of r depending on whether the scheme is response-revealing or response-hiding.

An example response-revealing structured encryption scheme $\Sigma$=(Setup, Token, Query) may include three polynomial-time techniques (e.g., algorithms) that may work as discussed below:

(K, EDS)←Setup($1^k$, DS): is a probabilistic algorithm that takes as input a security parameter $1^k$ and a structure DS and outputs a secret key K and an encrypted structure EDS.

tk←Token (K, q): is a (possibly) probabilistic algorithm that takes as input a secret key K and a query q and returns a token tk.

{⊥, r}←Query(EDS, tk): is a deterministic algorithm that takes as input an encrypted structure EDS and a token tk and outputs either ⊥ or a response.

As used herein, a response-revealing structured encryption scheme Σ may be indicated as "correct" if for all k∈ℕ, for all poly(k)-size structures DS:Q→R, for all (K, EDS) output by Setup($1^k$, DS) and all sequences of m=poly(k) queries $q_1, \ldots, q_m$, for all tokens tk, output by Token (K, $q_i$), Query(EDS, $tk_i$) returns DS($q_i$) with all but substantially negligible probability.

A response-hiding structured encryption scheme Σ=(Setup, Token, Query, Dec) may include four polynomial-time algorithms such that Setup and Token are as discussed above and Query and Dec may be defined as follows:

{⊥, ct}←Query (EDS, tk): is a deterministic algorithm that takes as input an encrypted structured EDS and a token tk and outputs either ⊥ or a ciphertext ct.

r←Dec (K, ct): is a deterministic algorithm that takes as input a secret key K and a ciphertext ct and outputs a response r.

As used herein, a response-hiding structured encryption scheme Σ may be indicated as "correct" if for all k∈ℕ, for all poly(k)-size structures DS:Q→R of type $\mathcal{T}$, for all (K, EDS) output by Setup($1^k$, DS) and all sequences of m=poly(k) queries $q_1, \ldots, q_m$, for all tokens $tk_i$ output by Token (K, $q_i$), $Dec_K$ (Query (EDS, $tk_i$)) returns DS ($q_i$) with all but substantially negligible probability.

An example notion of security for structured encryption may guarantee that an encrypted structure reveals no information about its underlying structure beyond the setup leakage $\mathcal{L}_S$ and that the query algorithm reveals no information about the structure and the queries beyond the query leakage $\mathcal{L}_Q$. If this holds for non-adaptively chosen operations then this may be referred to as non-adaptive semantic security. If, on the other hand, the operations are chosen adaptively, this may lead to a stronger notion of adaptive semantic security.

Let Z=(Setup, Token, Query) be a response-revealing structured encryption scheme and consider the following probabilistic experiments where $\mathcal{A}$ is a stateful adversary, S is a stateful simulator, $\mathcal{L}_S$ and $\mathcal{L}_Q$ are leakage profiles and z∈{0,1}*:

Real$_{\Sigma,\mathcal{A}}(k)$: given z the adversary $\mathcal{A}$ outputs a structure DS of type $\mathcal{T}$. It receives EDS from the challenger, where (K, EDS)←Setup($1^k$, DS). The adversary may then adaptively choose a polynomial number of queries $q_1, \ldots, q_m$. For all i∈[m], the adversary receives tk←Token (K, $q_i$). Finally, $\mathcal{A}$ outputs a bit b that is output by the experiment.

Ideal$_{\Sigma,\mathcal{A},S}(k)$: given z the adversary $\mathcal{A}$ generates a structure DS of type $\mathcal{T}$ which it sends to the challenger. Given z and leakage $\mathcal{L}_S$ (DS) from the challenger, the simulator S returns an encrypted data structure EDS to $\mathcal{A}$. The adversary may then adaptively choose a polynomial number of operations $q_1, \ldots, q_m$. For all i∈[m], the simulator receives a tuple (DS ($q_i$), $\mathcal{L}_Q$ (DS, $q_i$)) and returns a token $tk_i$ to $\mathcal{A}$. Finally, $\mathcal{A}$ outputs a bit b that is output by the experiment.

One skilled in the art of computing will understand that values other than "bits" may be used as well.

As used herein, Σ may be indicated as adaptively ($\mathcal{L}_S, \mathcal{L}_Q$)-semantically secure if for all PPT adversaries $\mathcal{A}$, there exists a PPT simulator S such that for all z∈{0,1}*, the following expression is substantially negligible in k:

$|Pr[\text{Real}_\Sigma \mathcal{A}(k)=1]-Pr[\text{Ideal }\Sigma, \mathcal{A}_S(k)=1]|$ The security definition for response-hiding schemes can be derived by giving the simulator (⊥, $\mathcal{L}_Q$ (DS, $q_i$)) instead of (DS ($q_i$), $\mathcal{L}_Q$ (DS, $q_i$)).

FIG. 1 is a block diagram of an example architecture 100 for controlling security of data in an encrypted database management system, as discussed further herein. As shown in the example of FIG. 1, a client device 102 may communicate with a server 104 (e.g., on a server device that is different from (and remote from) the client device 102) via a network 106. One skilled in the art of computing will understand that the client device 102 may also host the server 104 locally to the client device 102, without communicating through the network 106. For example, the server 104 may include an encrypted database management system (EDBMS) server 104.

A client-side security controller 108 may control secure processing of queries 110 in a relational database 112. For example, an application 114 may provide the queries 110 for processing. For example, the client-side security controller 108 may include an encrypted database generator 116, an encrypted query generator 118, and a decrypted query result generator 120.

For example, as shown in FIG. 1, the encrypted database generator 116 may generate an encrypted database 122, using the relational database 112. The encrypted database generator 116 may also output keys 124, as discussed further below.

As shown in FIG. 1, the server 104 may include a server security controller 126, that may include an encrypted database controller 128, an encrypted query controller 130, and an encrypted query result generator 132. For example, as shown in FIG. 1, the encrypted database controller 128 may control receipt of the encrypted database 122 from the client 102, and set up a server-side encrypted database 136, using the encrypted database 122.

For example, the encrypted query generator 118 may obtain a query 110 and generate an encrypted query 138 (e.g., a token), as discussed further below. For example, the encrypted query controller 130 may obtain the encrypted query 138, may store it locally as encrypted query 140, and may use it to query the encrypted database 136 (as discussed further below), to obtain an encrypted query result 142, which it may provide to the client-side security controller 108. For example, the encrypted query controller 130 may include a search engine that generates the encrypted query result 142 (e.g., as encrypted response to the secure query) by initiating a search on the encrypted relational database (122), without decrypting the secure query 138 and without decrypting the encrypted multi-maps The decrypted query result generator 120 may obtain the encrypted query result 142 and control decryption to generate a query result 144 (e.g., for the application 114, as a result of query 110). For example, if the encrypted query result 142 is a table, the decrypted query result generator 120 may decrypt each cell in the table to generate the query result 144.

An example structured encryption scheme for SPC queries on relational DBs is discussed below. FIGS. 2A, 2B, 3, 4A, and 4B illustrate an example implementation, which may be referred to herein as SPX. FIGS. 2A-2B illustrate an example Setup technique for an example structured encryption scheme for selection, projection and Cartesian product (SPC) queries on relational databases. As shown in FIG. 2A (202), the example scheme may make black-box use of a response-revealing multi-map encryption scheme $\Sigma_{MM}=$ (Setup, Token, Get), of a response-revealing dictionary encryption scheme $\Sigma_{DX}$=(Setup, Token, Get), and of a symmetric-key encryption scheme SKE=(Gen, Enc, Dec).

As shown in FIG. 2A, Setup may take as input (204) a relational database DB=$(T_1, \ldots, T_n)$ and may create (206) three multi-maps $MM_R$, $MM_C$ and $MM_V$, each of which stores a different representation of the database. For example, $MM_R$ stores its row-wise representation, i.e., it maps row coordinates (i.e., the row table and rank) to encrypted rows. Analogously, $MM_C$ stores a column-wise representation of DB and maps column coordinates (i.e., the column table and rank) to encrypted columns. Setup then encrypts $MM_R$ and $MM_C$ with $\Sigma_{MM}$, resulting in $EMM_R$ and $EMM_C$ (208). It then uses $MM_V$ to store (210) a value-wise representation of the database in the sense that the latter maps the value of a cell to tokens for the rows in DB that store that same value (where the tokens are for $EMM_R$). Again, it uses $\Sigma_{MM}$ to encrypt $MM_V$, resulting in $EMM_V$ (212). As discussed above, the SPC normal form may be indicated as:

$$\pi_{a_1, \ldots, a_h}([\alpha_1] \times [\alpha_j] \times \sigma_{\psi}(T_{i_1} \times \ldots \times T_{i_t})).$$

At a high-level, $EMM_C$ may enable projection operations and $EMM_V$ combined with $EMM_R$ may enable type-1 select operations (i.e., of the form $a_i = \alpha_i$). To support type-2 select operations, however, additional structures may be needed.

For this, (as shown in FIG. 2B) Setup may create (214), for all columns $c \in DB^T$, a multi-map $MM_C$ that maps pairs of the form $$\langle\langle tbl(c), crk(c)\rangle, \langle tbl(c'), crk(c')\rangle\rangle$$

to tokens for the rows $(r_1, r_2) \in DB_{att(c)=att(c')}$, where $c' \in DB^T$ is a column with the same domain as c. It then encrypts (216) each of these multi-maps with $\Sigma_{MM}$, resulting in a set $\{EMM_C\}_{c \in DB^T}$, and creates (218) a dictionary DX that maps the attributes of each column att(c), for all $c \in DB^T$, to $EMM_C$. It then encrypts DX with $\Sigma_{DX}$, resulting in an encrypted dictionary EDX (220).

Setup outputs (222) the key K=$(K_R, K_C, K_V, K_D, \{K_c\}_{c \in DB^T}, K_1)$, where $K_R$, $K_C$, $K_V$, $K_D$ and $\{K_c\}_{c \in DB^T}$ are the keys for $EMM_R$, $EMM_C$, $EMM_V$, EDX and $\{EMM_C\}_{c \in DB^T}$, respectively and $K_1$ is a key for SKE. The example encrypted database may be denoted as $$EDB = (EMM_R, EMM_C, EMM_V, EDX).$$

Figure 3:
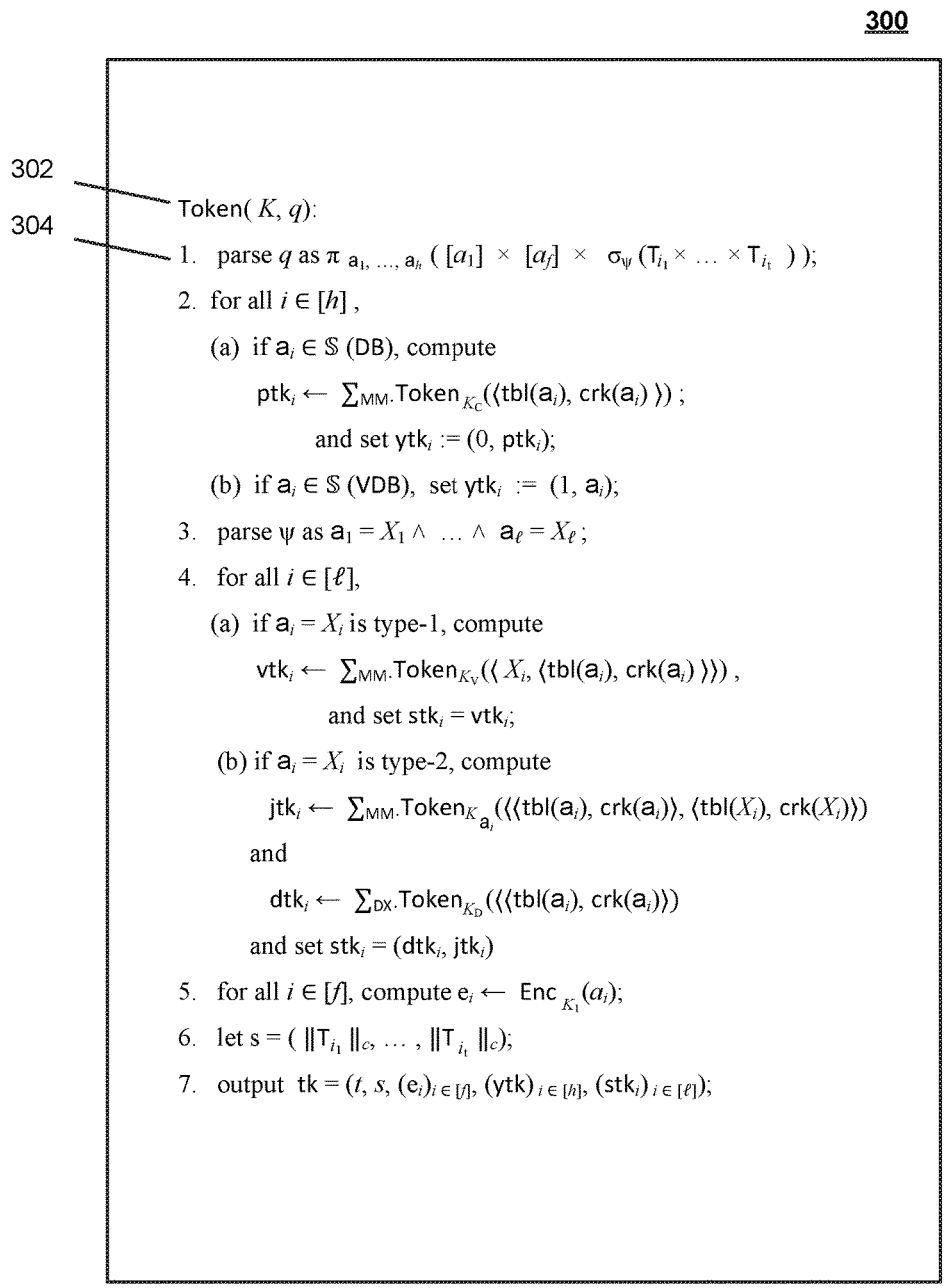
FIG. 3 illustrates an example Token generation technique for an example structured encryption scheme for selection, projection and Cartesian product (SPC) queries on relational databases.

FIG. 3 illustrates an example Token generation technique for an example structured encryption scheme for selection, projection and Cartesian product (SPC) queries on relational databases. For example, Token may take as input a secret key K and an SPC query q in normal form (302). The example technique may first generate tokens for the projections. As discussed above, in the SPC normal form, projections can occur either on virtual or real attributes. So, (shown as step 2 of FIG. 3) for all $i \in [h]$, if $a_i \in \$$ (VDB), Token sets $ytk_i = (1, a_i)$; otherwise, if $a_i \in \$$ (DB), it creates a projection token $ptk_i \leftarrow \Sigma_{MM}$.$Token_{K_C}(\langle tbl(a_i), crk(a_i)\rangle)$ and sets $ytk_i = (0, ptk_i)$.

For every constant $\alpha_1$ through $\alpha_f$ it computes $e_{\alpha_1} \leftarrow Enc_{K_1}(\alpha_1)$ through $e_{\alpha_f} \leftarrow Enc_{K_1}(\alpha_f)$. Then, for each term $a_i = X_i$ of $\psi$ it does the following. If the term is a type-1 query of the form $a_i = \alpha_i$, it computes an $EMM_V$ token $vtk_i$ for the pair that comprises the constant $\alpha_i$ and the coordinates of $a_i$ and sets $stk_i = vtk_i$. In this context, s-tokens of this form may be referred to as type-1 tokens. On the other hand, if the term is a type-2 query of the form $a_i = x_i$, then it computes two tokens $dtk_i$ and $jtk_i$. The first, $dtk_i$, is an EDX token for the coordinates of $a_i$ and the second, $jtk_i$, is an $EMM_{a_i}$ token for the pair that comprises the coordinates of $a_i$ and $x_i$. It then sets $stk_i = (dtk_i, jtk_i)$, shown as step 4 of FIG. 3. As used herein, s-tokens of this form may be referred to as type-2 tokens. Token then creates a vector s that holds the (column) size of $T_{i_1}, \ldots, T_{i_t}$ (shown as step 6 of FIG. 3) and outputs the token $$tk = (t, s, (e_{\alpha_i})_{i \in [f]}, (ytk_i)_{i \in [h]}, stk_i)_{i \in [t]}),$$

which is shown as step 7 of FIG. 3.

Figure 4A:
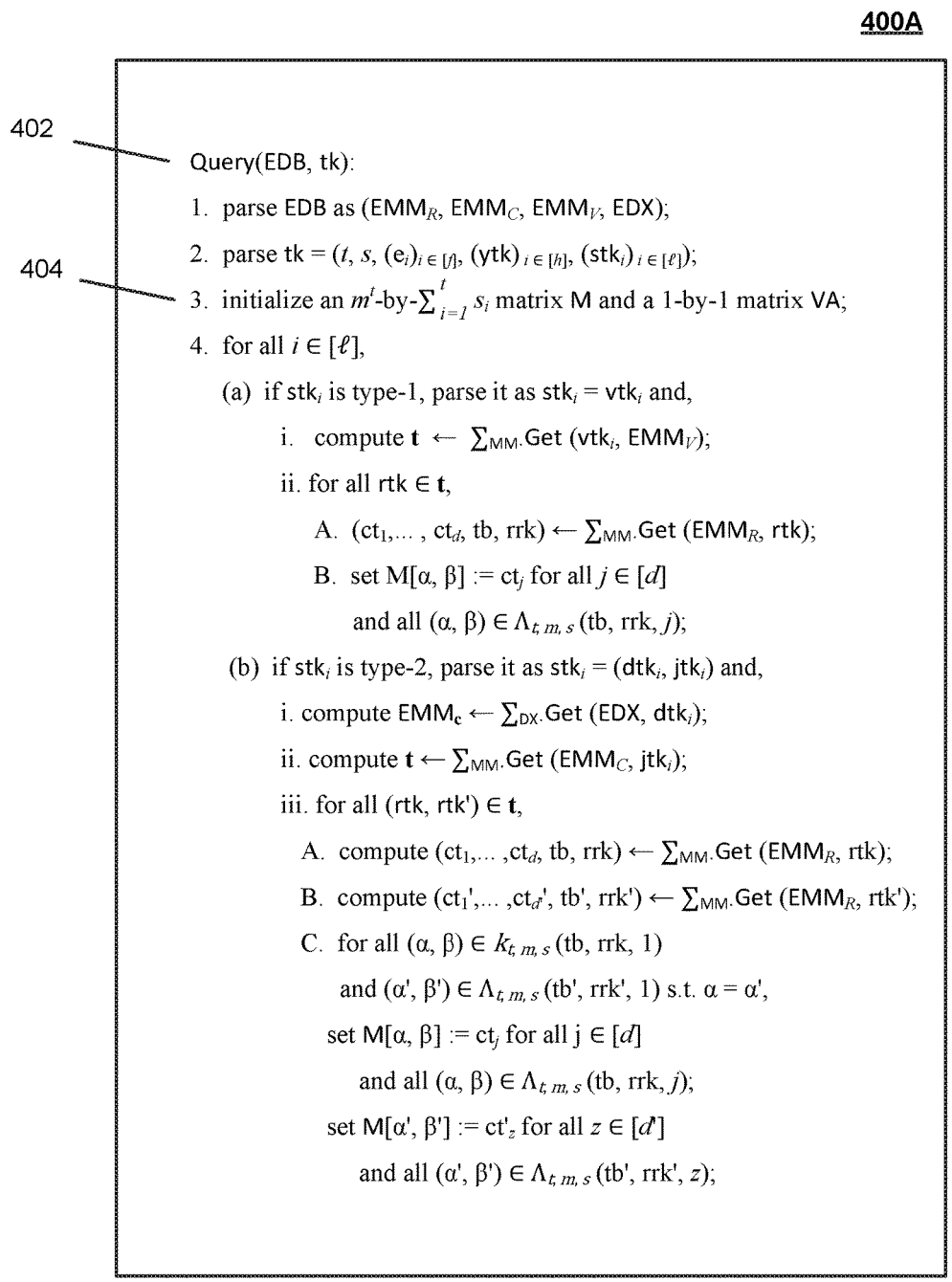
FIGS. 4A-4B illustrate an example Query processing technique for an example structured encryption scheme for selection, projection and Cartesian product (SPC) queries on relational databases.
Figure 4B:
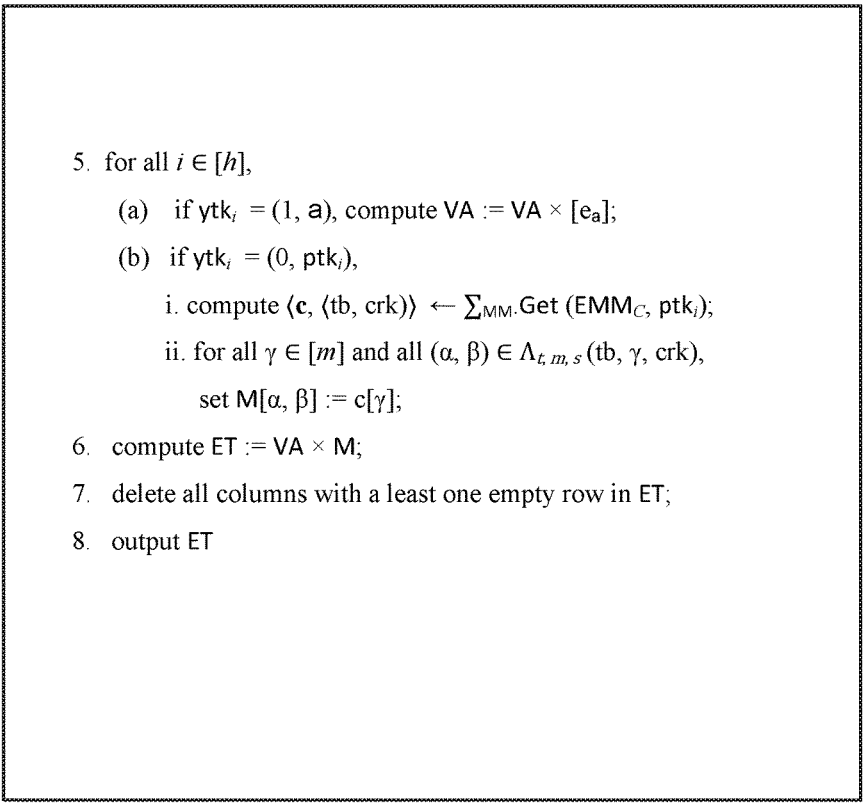

FIGS. 4A-4B illustrate an example Query processing technique for an example structured encryption scheme for selection, projection and Cartesian product (SPC) queries on relational databases. As shown in FIG. 4A, Query takes as input the encrypted database EDB and a token tk (402). Given the arity of the cross product t, the size of the columns m and the column-sizes s of the tables in the product, it instantiates an empty $m^t \times \Sigma_i s_i$ matrix M (404).

It then processes the s-tokens $stk_1$ through $stk_t$, shown as step 4 of FIG. 4A. If $stk_i$ is type-1, it uses it to query $EMM_V$. This results in a tuple t of row tokens which it then uses to query the $EMM_R$ structure. For example, for all $rtk \in t$, it may compute $$\langle ct_1, \ldots, ct_d, tb, rrk\rangle \leftarrow \Sigma_{MM}.Get(EMM_R, rtk),$$

where $\langle ct_1, \ldots, ct_d\rangle$ is an encrypted row and (tb, rrk) are its coordinates. These will be encryptions of the rows in DB that hold the constant $\alpha_i$ at column $a_i$, where $a_i$ and $\alpha_i$ are the attribute/constant pair in the type-1 select query that underlies $vtk_i$. For each ciphertext $ct_i$ of every encrypted row above, it then computes $(\alpha, \beta) \leftarrow_{t, m, s} (tb, rrk, i)$ and sets $M[\alpha, \beta] := ct_i$. On the other hand, if $stk_i$ is type-2, the algorithm uses $dtk_i$ to query EDX, resulting in an encrypted multi-map $EMM_C$ which it then queries with $jtk_i$. This last operation results in a tuple t of pairs of row tokens for $EMM_R$. For each pair of tokens, it queries $EMM_R$, resulting in a pair of encrypted rows with their coordinates. It uses the location map on each pair of coordinates to recover locations $(\alpha, \beta)$ and $(\alpha', \beta')$. If $\alpha = \alpha'$, it further uses the location map to place each ciphertext in the encrypted rows in M.

After processing the s-tokens, it processes the y-tokens $(ytk_1, \ldots, ytk_h)$ as follows. It starts by initializing a 1-by-1 matrix VA. Shown as step 5 in FIG. 4B, if $ytk_i$ has the form (1, a), for some attribute a, it sets VA=VA$\times e_a$.

Alternatively, if $ytk_i = (0, ptk_i)$, it computes $$\langle ct_1, \ldots, Ct_m, tb, crk\rangle \leftarrow \Sigma_{MM}.Get(EMM_C, ptk_i),$$

and for all $j \in [m]$ it sets $M[\alpha_j, \beta_j] := ct_j$, where $(\alpha_j, \beta_j) \leftarrow \Lambda_{t, m, s}$ (tb, crk, j). It then sets ET:=VA$\times$M (shown as step 6 in FIG. 4B) and outputs ET after eliminating all columns that contain at least one empty cell (shown as steps 7 and 8 in FIG. 4B).

The example Dec technique may take as input a secret key K and the encrypted table ET returned by the server and may simply decrypt each cell of ET.

For ease of exposition, an example discussion of SPX herein may not be the most efficient possible. For example, in practice, it may not be necessary to spend $O(m^t \cdot \Sigma_i s_i)$ work in Step 3 of Query to initialize M as M can be constructed dynamically throughout the query procedure. Also, since M may be sparse, one skilled in the art of computing will understand that alternative data structures besides a simple two-dimensional array may be more advantageous, without departing from the techniques discussed herein. Further, rows may be pruned from ET (in Step 6 of Query), whereas it may be more efficient, for example, to delete empty rows in M right after processing the s-tokens (and before processing the y-tokens) since that may reduce the size of the cross product in Step 6. Further, whereas the encrypted multi-maps $\{EMM_C\}_{c \in DB^T}$ may be stored in the encrypted dictionary EDX, this could also be done "by reference" where, instead of (i.e., in lieu of) storing the actual local multi-maps, a pointer to them may be stored.

An analysis of the search and storage efficiency of an example construction is discussed below.

With regard to search complexity, when processing a token, $$tk=(t,s,(e_{\alpha_i})_{i \in [l]},(ytk_i)_{i \in [h]},(\text{stk}_i)_{i \in [t]}),$$

on an encrypted database EDB=($EMM_R$, $EMM_C$, $EMM_V$, EDX), the server-side search complexity may be as discussed below.

Assuming, for ease of exposition, that all tables have the same number of rows m, the server may involve O(1) work for each virtual project and $O(m \cdot m^{t-1})$ for each real project. For each s-token of type-1, it may involve $O(\#DB_{a=\alpha} \cdot m^{t-1})$ work, where the s-token's underlying term is a=α. For s-tokens of type-2, it may involve $O(\#DB_{a=a'} \cdot m^{t-1})$ work, where the s-token's underlying term is a=a'. This may be competitive with the search complexity of an SPC normal form query on a plaintext relational database. However, commercial databases may not use the normal form and, as such, may execute queries faster by taking advantage of query optimization techniques.

With regard to storage complexity considerations, for a database DB=($T_1$, . . . , $T_n$), SPX may produce four encrypted multi-maps $EMM_R$, $EMM_C$, $EMM_V$, and EDX. Let $s=\Sigma_i \|T_i\|_C$. For ease of exposition, it may again be assumed each table has m rows. Further, it may be noted that standard multi-map encryption schemes may produce encrypted structures with storage overhead that may be linear in sum of the tuple sizes. Using such a scheme as the underlying multi-map encryption scheme, $EMM_R$ and $EMM_C$ may be $O(\Sigma_{r \in DB} \#r)$ and $O(\Sigma_{r \in DB^T} \#c)$, respectively, since the former maps the coordinates of each row in DB to their (encrypted) row and the latter maps the coordinates of the columns to their (encrypted) columns. Since $EMM_V$ maps each cell in DB to tokens for the rows that include the same value, it may involve $O(\Sigma_{c \in DB^T} \Sigma_{v \in c} \#DB_{c=v})$ storage. EDX may map the coordinates of each column $c \in DB^T$ to an encrypted multi-map $EMM_C$ which in turn maps each pair of form (c, c') such that dom(c)=dom (c') to a tuple of tokens for rows in $DB_{c=c'}$. As such, EDX may have size $$O(\Sigma_{c \in DB^T} \Sigma_{c': \text{dom}(c')=\text{dom}(c)} \#DB_{c=c'}).$$

The example expression above may vary substantially depending on the number of columns in DB with the same domain. In an example worst case, all columns may have a common domain and the expression may be a sum of s(s−1) terms of the form $\#DB_{c=c'}$. In an example best case, none of the columns may share a domain and EDX may be empty. In practice, however, it may be expected that there may be some relatively small number of columns with common domains.

As discussed below, the example construction may be adaptively-semantically secure with respect to a specified leakage profile. For example, some of the leakage may be "black-box" in the sense that it may come from the underlying schemes, and part of it may be "non-black-box" in the sense that it may come directly from the SPX construction itself. Throughout the discussion herein of SPX's leakage, both its black-box leakage (i.e., when the underlying schemes are left abstract) and its concrete leakage (i.e., when the underlying schemes are instantiated) are considered. To instantiate the underlying schemes, any of a standard set of SSE constructions which all have the same leakage profile (i.e., the search pattern which reveals if and when a query is repeated) may be considered (since the schemes are self-revealing, the "access pattern leakage" of SSE schemes (which may be defined as the search response) are not considered to be leakage herein). In particular, these SSE schemes may be used to instantiate both $\Sigma_{MM}$ and $\Sigma_{DX}$ since the former may be a generalization of the latter.

The setup leakage of SPX may capture what an adversary can learn before performing any query operation. The setup leakage of SPX may be denoted as $$\mathcal{L}_S^{spx}(DB)=(\mathcal{L}_S^{dx}(DX), \mathcal{L}_S^{mm}(MM_R), \mathcal{L}_S^{mm}(MM_C), \mathcal{L}_S^{mm}(MM_V)),$$

where $\mathcal{L}_S^{dx}$ and $\mathcal{L}_S^{mm}$ denote the setup leakages of $\Sigma_{DX}$ and $\Sigma_{MM}$, respectively. If the latter are instantiated with standard encrypted multi-map constructions, the setup leakage of SPX may comprise the number of rows and columns in DB. Standard encrypted dictionary constructions may leak only the maximum size of the values they store so the size of the $EMM_C$'s may be hidden (up to the maximum size).

The query leakage may be more complex and, for example, may be denoted as:

$$\mathcal{L}_Q^{spx}(DB,q)=(XPP(DB,q),PrP(DB,q),SelP(DB,q)),$$

where each individual pattern is discussed further below.

A first example leakage pattern for this discussion is the cross product pattern, which may be defined as:

$$XPP(DB,q)=\{t, \|T_{i_1}\|_C, \ldots, \|T_{i_l}\|_C, (|\alpha_i|)_{i \in [l]}\},$$

and includes the number and size of the tables needed in the query as well as the size of the virtual attributes.

A second example leakage pattern is the projection pattern which may be defined as:

$$PrP(DB,q)=(\mathcal{P}(a_1), \ldots, \mathcal{P}(a_h)),$$

where $$\mathcal{P}(a_i) = \begin{cases} (\text{real}, \mathcal{L}_Q^{mm}(MM_C, \langle tbl(a_i), crk(a_i)\rangle), & \\ \quad (|c_j|)_{j \in [\#c_i]}, AccP(c_i)) & \text{if } a_i \in \mathbb{S}(DB); \\ (\text{virtual}, a_i) & \text{if } a_i \in \mathbb{S}(VDB); \end{cases}$$

where $c_i \in DB^T$ is the column with attribute $a_i$ and $AccP(c_i)$ indicates if and when the column $c_i$ has been accessed before. PrP captures the leakage produced when the server queries $MM_C$ and for every attribute $a_i$ reveals whether the attribute is real or virtual. If it is real, it also reveals the size of the items in the projected column and if and when this column has been accessed before. Further, it also reveals the $\Sigma_{MM}$ query leakage on the coordinates of the projected attribute. If the latter is instantiated with any of the standard multi-map encryption schemes then this leakage may reveal whether the attribute $a_i$ has appeared in a previous query. If the attribute is virtual, it just reveals the attribute.

A third example leakage pattern is the selection pattern which may be defined as:

$$SelP(DB,q)=(\mathcal{Z}(a_1, X_1), \ldots, \mathcal{Z}(a_l, X_l))$$

If $a_i=X_i$ is type-1, then $\mathcal{Z}(a_i, X_i)$ may be defined as $$\mathcal{Z}(a_i,X_i)=(\text{type-1}, \mathcal{L}_Q^{mm}(MM_V, \langle X_i, \langle tbl(a_i),crk(a_i)\rangle\rangle),$$

$$\{\mathcal{L}_Q^{mm}(MM_R, \langle tbl(r),rrk(r)\rangle), AccP(r)\}^{r \in DB_{a_i=X_i}})$$

where AccP(r) indicates whether the row r has been accessed before. $\mathcal{Z}(a_i, X_i)$ may capture the leakage produced when the server queries $MM_V$ and may use the resulting row tokens to then query $MM_R$. It reveals whether the selection term is of type-1 and the $\Sigma_{MM}$ query leakage on the constant $X_i$ and the coordinates of the attribute $a_i$. In addition, it also leaks the $\Sigma_{MM}$ query leakage on the coordinates of the rows in $DB_{a_i=X_i}$ as well as if and when they have been accessed before. If the encrypted multi-maps are instantiated with standard constructions, $Z(a_i, X_i)$ amounts to: if and when the pair $(X_i, a_i)$ has been queried before and if and when any of the rows in $DB_{a_i=X_i}$ have been accessed in the past.

If, on the other hand, $a_i=X_i$ is type-2, then $\not{Z}(a_i, X_i)$ is defined as $$\not{Z}_{(a_i,X_i)}=(\text{type-2}, \mathcal{L}_Q^{dx}(DX, \langle tbl(a_i), crk(a_i)\rangle),$$
$$\mathcal{L}_S^{mm}(MM_{a_i}), AccP(EMM_{a_i}),$$

$$\mathcal{L}_Q^{mm}(MM_{a_i}, \langle tbl(a_i), crk(a)\rangle, \langle tbl(X_i), crk(X_i)\rangle)),$$

$$\{\mathcal{L}_Q^{mm}(MM_R, \langle\langle tbl(r_1), rrk(r_1)\rangle, AccP(r_1),$$

$$\mathcal{L}_Q^{mm}(MM_R, \langle tbl(r_2)\rangle), \text{AccP}(r_2)\}_{(r_1,r_2) \in DB_{a_i=X_i}}).$$

where $AccP(r)$, $AccP(r_1)$, $AccP(r_2)$, and $AccP(EMM_{a_i})$ indicate if and when $r$, $r_1$, $r_2$ and $EMM_{a_i}$ have been accessed before. In this case, $\not{Z}(a_i, X_i)$ captures the leakage produced when the server queries EDX to retrieve some $EMM_a$ which it in turn queries to retrieve row tokens with which to query $EMM_R$. It reveals whether the selection term is type-2, the $\Sigma_{DX}$ query leakage on the coordinates of $a_i$, the $\Sigma_{MM}$ setup leakage on $MM_{a_i}$ and if and when $EMM_{a_i}$ has been accessed in the past. In addition, it reveals the query leakage of $\Sigma_{MM}$ on the coordinates of $a_i$ and $X_i$ and, for every pair of rows $(r_1, r_2)$ in $DB_{a_i=X_i}$, their $\Sigma_{MM}$ query leakage and if and when they were accessed in the past. Again, if instantiated with standard encrypted multi-maps, this may amount to the type of the selection, if and when $a_i$ had been queried in the past, the number of columns in DB that share a domain with $a_i$, if and when the pair $(a_i, X_i)$ has appeared in previous queries and, for every pair of rows in $DB_{a_i=X_i}$, if and when these rows have been accessed in the past.

As mentioned in the above discussion, PPE-based solutions can handle a large class of SQL queries which includes conjunctive queries. However, to support conjunctive queries, these solutions may rely on deterministic encryption. For example, to handle a type-1 select on a column c, they may reveal a deterministic encryption of c (i.e., every element of the column is encrypted under the same key). To handle a type-2 select between two columns $c_1$ and $c_2$, they may reveal deterministic encryptions of both columns (under the same key). In turn, this may provide the frequency information on entire columns to the server. Depending on the setting, frequency patterns may be disadvantageous (see, e.g., Naveed et al., supra).

In comparison, SPX may leak substantially less. First, it may not leak any frequency information on entire columns or rows. For type-1 selects, it may only leak information about the attribute in the select and the rows that match the term. For type-2 selects, it may only leak information about the pair of attributes $(a_i, X_i)$ in the select and the rows that match the term. This leakage may be only a function of the attributes in the query and of the rows that match it, whereas the leakage in PPE-based solutions may be a function of entire columns. Moreover, in the case of SPX, if the underlying multi-map and dictionary schemes are instantiated with standard constructions, the information leaked about the attributes and matching rows may be "repetition" type of information, i.e., if and when they have appeared in the past. Analogously, the project operations in SPX may only leak information about the attributes in the project and the columns that match it and the information being leaked "repetition" type of information.

As discussed below, SPX may be proven to be adaptively semantically-secure with respect to the leakage profile discussed above.

Theorem 6.1. If $\Sigma_{DX}$ is adaptively $(\mathcal{L}_S^{dx}, \mathcal{L}_Q^{dx})$-semantically secure and $\Sigma_{MM}$ is adaptively $(\mathcal{L}_S^{mm}, \mathcal{L}_Q^{mm})$-secure, then SPX is $(\mathcal{L}_S^{spx}, \mathcal{L}_Q^{spx})$-semantically secure.

Proof. Let $S_{DX}$ and $S_{MM}$ be the simulators guaranteed to exist by the adaptive security of $\Sigma_{DX}$ and $\Sigma_{MM}$ and consider an SPX simulator S that works as follows. Given $\mathcal{L}_S^{spx}$ (DB), $S$ simulates EDB by computing $EDX \leftarrow S_{DX}(\mathcal{L}_S^{dx}(DX))$, $EMM_R \leftarrow S_{MM}(\mathcal{L}_S^{mm}(MM_R))$, $EMM_C \leftarrow S_{MM}(\mathcal{L}_S^{mm}(MM_C))$ and $EMM_V \leftarrow S_{MM}(\mathcal{L}_S^{mm}(MM_V))$ and outputting $$EDB=(EMM_R, EMM_C, EMM_V, EDX).$$

As discussed above, SPX is response-hiding so S receives $(\perp, \mathcal{L}_Q^{spx}(DB, q))$ as input in the $\text{Real}_{SPX, S^{(k)}}$ experiment. Given this input, S may simulate a token $$tk=(t, s, (e_i)_{i\in[f]}, (ytk_i)_{i\in[h]}, (stk_i)_{i\in[\ell]})$$

as follows. It retrieves t and s directly from XPP(DB, q). It then samples $K_1 \xleftarrow{\$} \{0, 1\}^k$ and, for all $i\in[f]$, computes $e_i \leftarrow Enc_{K_1}(0^{|\alpha_i|})$, where $|\alpha_i|$ is also from XPP(DB, q).

For all $i\in[h]$, if $$\mathcal{P}(a_i)=(\text{real}, \mathcal{L}_Q^{mm}(MM_C, \langle tbl(a_i), crk(a_i)\rangle),$$
$$(|c_j|)_{j\in[\#c]}, AccP(c))$$

it sets $$ytk_i:=ptk_i \leftarrow S_{MM}((ct_j)_{j\in[\#c]}, \mathcal{L}_Q^{mm}(MM_C,$$
$$\langle tbl(a_i), crk(a_i)\rangle)),$$

where $ct_j \leftarrow Enc_{K_1}(0^{|c_j|})$ if the column has not been accessed before and where $ct_j$ is the previously used ciphertext otherwise. If, on the other hand, $\mathcal{P}(a_i)=(\text{virtual}, a_i)$ it sets $ytk_i:=a_i$.

Then, for all $i\in[\ell]$, it simulates $stk_i$ as follows. If $\not{Z}(a_i)$ is type-1, it first computes for all $r\in DB_{a_i=X_i}$, $$rtk_r \leftarrow S_{MM}((ct_j)_{j\in[\#r]}, \mathcal{L}_Q^{mm}(MM_R, \langle tbl(r), rrk(r)\rangle))$$

where $ct_j \leftarrow Enc_{K_1}(0^{|r_j|})$ if r has not been accessed and $ct_j$ is the previously used ciphertext otherwise. It may then compute the token $$stk_1:=vtk_1 \leftarrow S_{MM}((rtk_r)^{r\in DB_{a_i=X_i}},$$
$$\mathcal{L}_Q^{mm}(MM_v, \langle tbl(a_1), crk(a_i)\rangle)).$$

If, on the other hand, $\not{Z}(a_i)$ is type-2, S may start by computing $$dtk_i \leftarrow S_{DX}(EMM_{a_i}, \mathcal{L}_Q^{dx}(\langle tbl(a_i), crk(a_i)\rangle))$$

where $EMM_{a_i} \leftarrow S_{MM}(\mathcal{L}_S^{mm}(MM_{a_i}))$ if it has not been accessed before and where $EMM_{a_i}$ is the previously-used structure otherwise. It then computes, for all $(r_1, r_2)\in DB_{a_i=X_i}$, $$rtk_1 \leftarrow S_{MM}((ct_j)_{j\in[\#r_1]}, \mathcal{L}_Q^{MM}(MM_R,$$
$$\langle tbl(r_1), rrk(r_1)\rangle))$$

and $$rtk_2 \leftarrow S_{MM}((ct'_j)_{j\in[\#r_2]}, \mathcal{L}_Q^{MM}(MM_R,$$
$$\langle tbl(r_2), rrk(r_2)\rangle)),$$

where $ct_j \leftarrow Enc_{K_1}(0^{|r_1[j]|})$ and $ct'_j \leftarrow Enc_{K_1}(0^{|r_2[j]|})$ if they have not been accessed and $ct_j$ and $ct'_j$ are the previously-used ciphertexts otherwise. Finally, it may compute $$jtk_i \leftarrow S_{MM}(\{rtk_{r_1}, rtk_{r_2}\}_{(r_1 r_2)}^{r\in DB_{a_i=X_i}}, \mathcal{L}_Q^{mm}(MM_R,$$
$$\langle tbl(a_i), tbl(X_i)\rangle)),$$

and sets $stk_i=(dtk_i, jtk_i)$.

As discussed further below, for probabilistic polynomial-time adversaries $\mathcal{A}$, the probability that Real $_{\text{SPX},\mathcal{A}}$ (k) outputs 1 is negligibly-close to the probability that Ideal $_{\text{SPX},\mathcal{A},S}$ (k) outputs 1. This may be shown using the following sequence of games:

Game$_0$: is substantially the same as a Real $_{\text{SPX},\mathcal{A}}$ (k) experiment. For ease of exposition, Loc$_\psi$ may be defined as the tuple of left-hand-side attributes in the type-2 terms of $\psi$; i.e., the $a_i$'s in the terms of form $a_i = x_i$.

Game$_1$: is substantially the same as Game$_0$, except that EMM$_C$ is replaced with the output of $S_{MM}(\mathcal{L}_S^{mm}(MM_C))$ and, for normal form queries q, each real y-token ytk$_i$ is replaced with the output of $$S_{MM}((ct_j)_{j \in [\#c]}, AccP(e), \mathcal{L}_Q^{mm}(MM_C, \langle tbl(a_i), crk(a_i) \rangle)).$$

Game$_2$: is substantially the same as Game$_1$, except that EMM$_V$ is replaced with the output of $S_{MM}(\mathcal{L}_S^{mm}(MM_V))$ and, for normal form queries q, every type-1 s-token stk$_i$ is replaced with the output of $$S_{mm}((rtk_r)^{r \in DB_{a_i} = x_i}, \mathcal{L}_Q^{mm}(MM_v, \langle tbl(a_i), crk(a_i) \rangle)).$$

Game$_3$: is substantially the same as Game$_2$, except that EDX is replaced with the output of $S_{DX}(\mathcal{L}_S^{dx}(DX))$ and, for normal form queries q, every dictionary token dtk$_i$ in type-2 s-tokens stk$_i$=(dtk$_i$, jtk$_i$) are replaced with the output of $$S_{DX}(EMM_{a_i}, AccP(EMM_{a_i}), \mathcal{L}_Q^{dx}(\langle tbl(a_i), crk(a_i) \rangle)).$$

Game$_{3+l}$ for $l \in [\#Loc_\psi]$: is substantially the same as Game$_{2+l}$, except that EMM$_{Loc_\psi[l]}$ is replaced with the output of $S_{MM}(\mathcal{L}_S^{mm}(MM_{Loc_\psi[l]}))$ and for all type-2 terms $a_i = x_i$ in $\psi$ such that $a_i = Loc_\psi[l]$, the join tokens jtk$_i$ in the type-2 s-token stk$_i$=(dtk$_i$, jtk$_i$) is replaced with the output of $$S_{MM}(\{rtk_{r_1}, rtk_{r_2}\}^{(r_1, r_2) \in DB_{Loc_\psi[l]} = x_i},$$
$$\mathcal{L}_Q^{mm}(MM_{Loc_\psi[l]}, \langle tbl(Loc_\psi[l]), crk(Loc_\psi[l]) \rangle,$$
$$\langle tbl(x_i), crk(x_i) \rangle)).$$

Game$_{4+\#Loc_\psi}$: is substantially the same as Game$_{3+\#Loc_\psi}$, except that EMM$_R$ is replaced with the output of $S_{MM}(\mathcal{L}_S^{mm}(MM_R))$ and every row token rtk$_r$ for a row r is replaced with the output of $$S_{MM}((ct_j)_{j \in [\#r]}, AccP(r), \mathcal{L}_Q^{mm}(MM_R, \langle tbl(r), rrk(r) \rangle))$$

where $ct_j \leftarrow Enc_{K_1}(r_j)$.

Game$_{5+\#Loc_\psi}$: is substantially the same as Game$_{4+\#Loc_\psi}$, except that each SKE encryption ct of a message m is replaced with $ct \leftarrow Enc_{K_1}(0^{|m|})$. Message size information is available to the simulator S through its leakage.

Game$_{6+\#Loc_\psi}$: is substantially the same as Game$_{5+\#Loc_\psi}$, except that for every token tk for a normal form query q, t and s are replaced with t and s from XPP(DB, q). Game$_{6+\#Loc_\psi}$ is substantially the same as Ideal $_{\text{SPX},\mathcal{A},S}$ (k).

Assertion: For all PPT adversaries $\mathcal{A}$,

|Pr[Game$_0$=1]−Pr[Game$_1$=1]|≤negl(k).

As discussed further below, if there exists a PPT adversary $\mathcal{A}$ that contradicts the assertion, then there exists a PPT adversary $\mathcal{B}$ that breaks the adaptive semantic security of $\Sigma_{MM}$ with respect to an arbitrary PPT simulator $S$. $\mathcal{B}$ starts by running $\mathcal{A}$. When $\mathcal{A}$ outputs DB=(T$_1$, . . . , T$_n$), $\mathcal{B}$ creates a dictionary DX, a column multi-map MM$_C$, a row multi-map MM$_R$, a value multi-map MM$_V$ and a set of multi-maps $\{MM_c\}_{c \in DB^T}$, from DB. For example, this may be done by executing Steps 1 through 10 of SPX.Setup. $\mathcal{B}$ then outputs MM$_C$. Upon receiving EMM$_C^*$—from either a Real$_{\Sigma_{MM},\mathcal{E}}$ (k) experiment or an Ideal$_{\Sigma_{MM},\mathcal{E},S}$(k) experiment—$\mathcal{B}$ sends ERD to $\mathcal{A}$, where

EDB=(EMM$_R$, EMM$_C^*$, EMM$_V$, EDX), with (K$_D$, EDX)$\leftarrow \Sigma_{DX}$.Setup(1$^k$, DX) such that for all $c \in DB^T$, DX[c]=EMM$_c$ where (K$_c$, MM$_c$)$\leftarrow \Sigma_{MM}$.Setup(1$^k$, EMM$_c$), $\{K_R, EMM_R\} \leftarrow \Sigma_{MM}$.Setup (1$^k$, MM$_R$) and (K$_V$, EMM$_V$)$\leftarrow \Sigma_{MM}$.Setup (1$^k$, MM$_V$)).

Whenever $\mathcal{A}$ outputs a normal form query $q = \pi_{a_1, \ldots, a_f}([\alpha_1] \times [\alpha_f] \times \sigma_\psi(T_{i_1} \times \ldots \times T_{i_t}))$ where $\psi = a_1 = X_1 \wedge \ldots \wedge a\ell = X X\ell$, $\mathcal{B}$ does the following. For all $i \in [h]$, $\mathcal{B}$ outputs $\langle tbl(a_i), crk(a_i) \rangle$ as its own query to EMM$_C^*$ and receives ytk$_i^*$. It then sends $\mathcal{A}$ the token $$tk = (t, s, (e_i)_{i \in [f]}, (ytk_i)_{i \in [h]}^*, (stk_i)_{i \in [\ell]});$$

where t is the number of queried tables, $s = \Sigma_{j=1}^t \|T_{i_j}\|_c$ and for all $i \in [f]$, $e_i \leftarrow Enc_{K_1}(\alpha_i)$. For all $i \in [\ell]$, if $a_i = X_i$ is type-1, then stk$_i$=vtk$_i$ such that vtk$_i \leftarrow \Sigma_{MM}$.Token$_{K_V}$(($X_i$, $\langle tbl(a_i), crk(a_i) \rangle$)).

Otherwise if $a_i = X_i$ is type-2, then stk$_i$=(dtk$_i$, jtk$_i$) such that dtk$_i \leftarrow \Sigma_{DX}$.Token$_{K_D}$ ($\langle tbl(a_i), crk(a_i) \rangle$) and jtk$_i \leftarrow \Sigma_{MM}$.Token$_{K_{a_i}}$($\langle \langle tbl(a_i), crk(a_i) \rangle, \langle tbl(X_i), crk(X_i) \rangle \rangle$).

After answering all of $\mathcal{A}$ queries, $\mathcal{A}$ outputs a bit which $\mathcal{B}$ returns as its own output. One skilled in the art of computing will understand that values other than "bits" may be used as well.

It may be noted that if $\mathcal{B}$ is executed in a Real$_{\Sigma_{MM},\mathcal{E}}$ (k) experiment then, by construction, $\mathcal{A}$'s view is substantially its view in Game$_0$. On the other hand, if $\mathcal{B}$ is executed in an Ideal$_{\Sigma_{MM},\mathcal{E},S}$(k) experiment, then $\mathcal{A}$'s view is, by construction, substantially its view in Game$_1$. It follows by the initial assumption, as discussed above, that

| Pr[Real$_{\Sigma_{MM},\mathcal{E}}$ (k)=1]−Pr[Ideal$_{\Sigma_{MM},\mathcal{E},S}$(k)=1]| is non-negligible, which is a contradiction.

Assertion. For all PPT adversaries $\mathcal{A}$,

|Pr[Game$_1$=1]−Pr[Game$_2$=1]|≤negl(k).

As discussed further below, if there exists a PPT adversary $\mathcal{A}$ that contradicts the assertion, then there exists a PPT adversary $\mathcal{B}$ that breaks the adaptive semantic security of $\Sigma_{MM}$ with respect to an arbitrary PPT simulator $S$. $\mathcal{B}$ starts by running $\mathcal{A}$. When $\mathcal{A}$ outputs DB=(T$_1$, . . . , T$_n$), $\mathcal{B}$ creates a dictionary DX, a column multi-map MM$_C$, a row multi-map MM$_R$, a value multi-map MM$_V$ and a set of multi-maps $\{MM_c\}_{c \in DB^T}$, from DB. $\mathcal{B}$ then outputs MM$_V$. Upon receiving EMM$_V^*$—from either a Real$_{\Sigma_{MM},\mathcal{E}}$ (k) experiment or an Ideal$_{\Sigma_{MM},\mathcal{E},S}$(k) experiment—$\mathcal{B}$ sends ERD to $\mathcal{A}$, where

EDB=(EMM$_R$, EMM$_C$, EMM$_V^*$, EDX), with EMM$_C \leftarrow \mathcal{L}_{MM}$ ($S_S^{mm}$ (MM$_C$)), (K$_D$, EDX)$\leftarrow \Sigma_{DX}$.Setup(1$^k$, DX) such that for all $c \in DB^T$, DX[c]=EMM$_c$ where (K$_c$, MM$_c$)$\leftarrow \Sigma_{MM}$.Setup(1$^k$, EMM$_c$) and (K$_R$, EMM$_R$)$\leftarrow \Sigma_{MM}$.Setup (1$^k$, MM$_R$).

When $\mathcal{A}$ outputs a normal form query q, $\mathcal{B}$ does the following. For all $i \in [\ell]$ such that $a_i = X_i$ is type-2, $\mathcal{B}$ outputs $\langle X_i, \langle tbl(a_i), crk(a_i) \rangle \rangle$ as its own query to EMM$_V^*$ and receives vtk$_i^*$. It then sends to $\mathcal{A}$ the token $$tk = (t, s, (e_i)_{i \in [f]}, (ytk_i)_{i \in [h]}, (stk_i)_{i \in [\ell]}^*);$$

where t is the number of queried tables, $s = \Sigma_{j=1}^t \|T_{i_j}\|_c$ and for all $i \in [f]$, $e_i \leftarrow Enc_{K_1}(a_i)$. If $a_i \in \$ (DB)$, $$ytk_i := ptk_i \leftarrow S_{MM}((ct_j)_{j \in [\#c]}, AccP(a_i), \mathcal{L}_Q^{mm}(MM_C, \langle tbl(a_i), crk(a_i) \rangle)).$$

Given AccP($a_i$), $ct_j$ is either equal to $Enc_{K_1}$ ($c_j$) if the column has not been accessed before, or the previously used ciphertext otherwise. If, on the other hand, $a_i \in \mathbb{S}$ (VDB), $ytk_i := a_i$. For all $i \in [\ell]$, if $a_i = X_i$ is type-2, then $stk_i = (dtk_i, jtk_i)$ such that $dtk_i \leftarrow_{DX}.Token_{K_D}$ (⟨tbl($a_i$), crk($a_i$)⟩) and $jtk_i \leftarrow \Sigma_{MM}. \text{Token}_{K_{a_i}}$ ((⟨tbl($a_i$), crk($a_i$)⟩, ⟨tbl($X_i$), crk($X_i$)⟩)).

After answering all of $\mathcal{A}$'s queries, $\mathcal{A}$ outputs a bit which $\mathcal{B}$ returns as its own output. One skilled in the art of computing will understand that values other than "bits" may be used as well.

It may be noted that if $\mathcal{B}$ is executed in a $\text{Real}_{\Sigma_{MM},\mathcal{B}}$ (k) experiment then, by construction, $\mathcal{A}$'s view is substantially its view in Game$_1$. On the other hand, if $\mathcal{B}$ is executed in an $\text{Ideal}_{\Sigma_{MM},\mathcal{B},S}$ (k) experiment, then $\mathcal{A}$'s view is, by construction, substantially its view in Game$_2$. It follows by the initial assumption, as discussed above, that

|$Pr$[ $\text{Real}_{\Sigma_{MM},\mathcal{B}}$ (k)=1]–$Pr$[ $\text{Ideal}_{\Sigma_{MM},\mathcal{B},S}$ .(k)=1]| is non-negligible, which is a contradiction.

Assertion. For all PPT adversaries $\mathcal{A}$,

|$Pr$[Game$_2$=1]–$Pr$[Game$_3$=1]|≤negl(k).

As discussed further below, if there exists a PPT adversary $\mathcal{A}$ that contradicts the assertion, then there exists a PPT adversary $\mathcal{B}$ that breaks the adaptive semantic security of $\Sigma_{DX}$ with respect to an arbitrary PPT simulator $S$. $\mathcal{B}$ starts by running $\mathcal{A}$. When $\mathcal{A}$ outputs DB=($T_1, \ldots, T_n$), $\mathcal{B}$ creates a dictionary DX, a column multi-map MM$_C$, a row multi-map MM$_R$, a value multi-map MM$_V$ and a set of multi-maps $\{MM_c\}_{c \in DB^T}$, from DB. $\mathcal{B}$ then outputs DX. Upon receiving EDX*—from either a $\text{Real}_{\Sigma_{DX},\mathcal{B}}$ (k) experiment or an $\text{Ideal}_{\Sigma_{DX},\mathcal{B},S}$ .(k) experiment—$\mathcal{B}$ sends ERD to $\mathcal{A}$, where

EDB=(EMM$_R$,EMM$_C$,EMM$_V$,EDX*), with EMM$_C \leftarrow S_{MM}$ ($\mathcal{L}_S^{mm}$ (MM$_C$)), EMM$_V \leftarrow S_{MM}$ ($\mathcal{L}_S^{mm}$ (MM$_V$)), and (K$_R$, EMM$_R$)$\leftarrow \Sigma_{MM}$.Setup (1$^k$, MM$_R$).

Whenever $\mathcal{A}$ outputs a normal form query q, $\mathcal{B}$ does the following. For all $i \in [\ell]$ such that $a_i = X_i$ is type-2, $\mathcal{B}$ outputs ⟨⟨tbl($a_i$), crk($a_i$)⟩⟩ as its own query to EDX* and receives $dtk_i^*$. It then sends to $\mathcal{A}$ the token $tk=(t,s,(e_i)_{i\in[v]},(ytk)_{i\in[h]}$ (stk$_i$)$_{i \in [\ell]}^*$ );

where t is the number of queried tables, $s = \Sigma_{j=1}^t \|T_{i_j}\|_c$ and for all $i \in [f]$, $e_i \leftarrow Enc_{K_1}$ ($\alpha_i$). If $a_i \in \mathbb{S}$ (DB), $ytk_i := ptk_i \leftarrow S_{MM}((ct_j)_{j \in [\#c]}, AccP(a_i), \mathcal{L}_Q^{mm}(MM_C,$
⟨tbl($a_i$),crk($a_i$)⟩)).

Given AccP($a_i$), $ct_j$ is either equal to $Enc_{K_1}$ ($c_j$) if the column has not been accessed before, or the previously used ciphertext otherwise. If, on the other hand, $a_i \in \mathbb{S}$ (VDB), $ytk_i := a_i$. For all $i \in [\ell]$, if $a_i = X_i$ is type-1, $stk_i := vtk_i \leftarrow S_{MM}$ ((rtk$_r$)$^{r \in DB_{a_i = X_i}}$, $\mathcal{L}_Q^{mm}$ (MM$_V$, ⟨tbl($a_i$), crk($a_i$)⟩)), with $rtk_r \leftarrow \Sigma_{MM}.Token_{K_R}$ (⟨tbl(r), rrk(r)⟩) for $r \in DB_{a_i = X_i}$. If $a_i = X_i$ is type-2, then $stk_i = (dtk_i^*, jtk_i)$ such that $jtk_i \leftarrow \Sigma_{MM}$. Token$_{K_{a_i}}$ ( ⟨⟨tbl($a_i$), crk($a_i$)⟩, ⟨tbl($X_i$), crk($X_i$)⟩⟩ ).

After answering all of $\mathcal{A}$'s queries, $\mathcal{A}$ outputs a bit which $\mathcal{B}$ returns as its own output. One skilled in the art of computing will understand that values other than "bits" may be used as well.

It may be noted that if $\mathcal{B}$ is executed in a $\text{Real}_{\Sigma_{MM},\mathcal{B}}$ (k) experiment then, by construction, $\mathcal{A}$'s view is substantially its view in Game$_2$. On the other hand, if $\mathcal{B}$ is executed in an $\text{Ideal}_{\Sigma_{DX},\mathcal{B},S}$ (k) experiment, then $\mathcal{A}$'s view is, by construction, substantially its view in Game$_3$. It follows by the initial assumption, as discussed above, that

|$Pr$[ $\text{Real}_{\Sigma_{DX},\mathcal{B}}$ (k)=1]–$Pr$[ $\text{Ideal}_{\Sigma_{DX},\mathcal{B},S}$ .(k)=1]| is non-negligible, which is a contradiction.

Assertion. For all $l \in [\#Loc_\psi]$, all PPT adversaries $\mathcal{A}$,

|$Pr$[Game$_{2+l}$=1]–$Pr$[Game$_{3+l}$=1]|≤negl(k).

As discussed further below, if there exists a PPT adversary $\mathcal{A}$ that contradicts the assertion, then there exists a PPT adversary $\mathcal{B}$ that breaks the adaptive semantic security of $\Sigma_{MM}$ with respect to an arbitrary PPT simulator $S$. $\mathcal{B}$ starts by running $\mathcal{A}$. When $\mathcal{A}$ outputs DB=($T_1, \ldots, T_n$), $\mathcal{B}$ creates a dictionary DX, a column multi-map MM$_C$, a row multi-map MM$_R$, a value multi-map MM$_V$ and a set of multi-maps $\{MM_c\}_{c \in DB^T}$, from DB. $\mathcal{B}$ then outputs MM$_{Loc_\psi[l]}$. Upon receiving EMM$_{Loc_\psi}^*$ [l]—from either a $\text{Real}_{\Sigma_{MM},\mathcal{B}}$ (k) experiment or an $\text{Ideal}_{\Sigma_{MM},\mathcal{B},S}$ .(k) experiment—$\mathcal{B}$ sends ERD to $\mathcal{A}$, where

EDB=(EMM$_R$,EMM$_C$,EMM$_V$,EDX), with EMM$_C \leftarrow S_{MM}$ ($\mathcal{L}_S^{mm}$ (MM$_C$)), EMM$_V \leftarrow S_{MM}$ ($\mathcal{L}_S^{mm}$ (MM$_V$)), EDX$\leftarrow S_{DX}$ ($\mathcal{L}_S^{dx}$ (DX)) and (K$_R$, EMM$_R$)$\leftarrow \Sigma_{MM}$.Setup(1$^k$, MM$_R$).

Whenever $\mathcal{A}$ outputs a normal form query q, $\mathcal{B}$ does the following. For all $i \in [\ell]$ such that $a_i = X_i$ with $a_i = Loc_\psi[l]$, $\mathcal{B}$ outputs ⟨⟨tbl(Loc$_\psi$[l]), crk(Loc$_\psi$[l])⟩, ⟨tbl($X_i$), crk($X_i$)⟩⟩ as its own query to EMM$_{Loc_\psi[l]}^*$ and receives $jtk_i^*$. It then sends to $\mathcal{A}$ the token $tk=(t,s,(e_i)_{i\in[f]},(ytk)_{i\in[h]}$ (stk$_i$)$_{i \in [\ell]}^*$ );

where t is the number of queried tables, $s = \Sigma_{j=1}^t \|T_{i_j}\|_c$ and for all $i \in [f]$, $e_i \leftarrow Enc_{K_1}$ ($\alpha_i$). If $a_i \in \mathbb{S}$ (DB), $ytk_i := ptk_i \leftarrow S_{MM}((ct_j)_{j \in [\#c]}, AccP(a_i), \mathcal{L}_Q^{mm}(MM_C,$
⟨tbl($a_i$),crk($a_i$)⟩)).

Given AccP($a_i$), $ct_j$ is either equal to $Enc_{K_1}$ ($c_j$) if the column has not been accessed before, or the previously used ciphertext otherwise. If, on the other hand, $a_i \in \mathbb{S}$ (VDB), $ytk_i := a_i$. For all $i \in [\ell]$, if $a_i = X_i$ is type-1, $stk_i := vtk_i \leftarrow S_{MM}$ ((rtl$_r$)$^{r \in DB_{a_i = x_i}}$, $\mathcal{L}_Q^{mm}$ (MM$_V$, ⟨tbl($a_i$), crk($a_i$)⟩)), with $rtk_r \leftarrow \Sigma_{MM}.Token_{K_R}$ (⟨tbl(r), rrk(r)⟩) for $r \in DB_{a_i = X_i}$. If $a_i = X_i$ is type-2, then $stk_i = (dtk_i, jtk_i^*)$ equals:

1) if z=1, $dtk_i \leftarrow S_{DX}$ (EMM$_{Loc_\psi[l]}^*$, $\mathcal{L}_Q^{dx}$ (⟨tbl(Loc$_\psi$[1]), crk(Loc$_\psi$[1])⟩ )) and $jtk_i = jtk_i^*$.

2) for all z<1, $dtk_i \leftarrow S_{DX}$ (EMM$_{Loc_\psi[z]}$, AccP (EMM$_{Loc_\psi[z]}$), $\mathcal{L}_Q^{dx}$ (⟨tbl(Loc$_\psi$[z]), crk(Loc$_\psi$[z])⟩ )) where AccP(EMM$_{Loc_\psi[z]}$) is a leakage that captures when and where EMM$_{Loc_\psi[z]}$ was generated. Thus, it can be either equal to EMM$_{Loc_\psi[z]} \leftarrow S_{MM}(\mathcal{L}_S^{mm}$ (MM$_{Loc_\psi[z]}$)), or, a previously simulated one, and $jtk_i \leftarrow S_{MM}(\{rtk_{r_1}, rtk_{r_2}\}^{(r_1, r_2) \in DB_{Loc_\psi[l]=x_i}}$,
$\mathcal{L}_Q^{mm}(MM_{Loc_\psi[z]=x_i}$, ⟨tbl(Loc$_{104}$[z]),tbl($x_i$)⟩)), with $rtk_{r_1} \leftarrow \Sigma_{MM}.Token_{K_R}(⟨$tbl($r_1$), rrk($r_1$)⟩) and $rtk_{r_2} \leftarrow \Sigma_{MM}.Token_{K_R}$ (⟨tbl($r_2$), rrk($r_2$)⟩).

3) for all z>1, $dtk_i \leftarrow S_{DX}$ (EMM$_{Loc_\psi[z]}$, AccP (EMM$_{Loc_\psi[z]}$), ⟨$\mathcal{L}_Q^{dx}$ (tbl(Loc$_\psi$[z]), crk(Loc$_\psi$[z])⟩ )) with either EMM$_{Loc_\psi[z]} \leftarrow \Sigma_{MM}$.Setup (1$^k$, MM$_{Loc_\psi[z]}$), or a previously generated one, and $jtk_i \leftarrow \Sigma_{dMM}.$ Token$_{K_{a_i}}$ ⟨tbl(Loc$_{104}$[z]),crkLoc$_{104}$[z]⟩,
⟨tbl($x_i$),crk($X_i$)⟩).

After answering all of $\mathcal{A}$'s queries, $\mathcal{A}$ outputs a bit which $\mathcal{B}$ returns as its own output. One skilled in the art of computing will understand that values other than "bits" may be used as well.

It may be noted that if $\mathcal{B}$ is executed in a ⟨(k) experiment then, by construction, $\mathcal{A}$'s view is substantially its view in Game$_{2+l}$. On the other hand, if ⟩ is executed in an $\text{Ideal}_{\Sigma_{MM},\mathcal{B},S}$ .(k) experiment, then $\mathcal{A}$'s view is, by construction, substantially its view in Game$_{3+1}$. It follows by the initial assumption, as discussed above, that $$|Pr[\text{Real}_{\Sigma_{MM},\mathcal{B}}(k)=1]-Pr[\text{Ideal}_{\Sigma_{MM},\mathcal{B},S}(k)=1]|$$

is non-negligible, which is a contradiction.

Assertion. For all PPT adversaries $\mathcal{A}$, $$|Pr[\text{Game}_{3+\#Loc_\psi}=1]-Pr[\text{Game}_{4+\#Loc_\psi}=1]|\leq\text{negl}(k).$$

As discussed further below, if there exists a PPT adversary $\mathcal{A}$ that contradicts the assertion, then there exists a PPT adversary $\mathcal{B}$ that breaks the adaptive semantic security of $\Sigma_{MM}$ with respect to an arbitrary PPT simulator $S$. $\mathcal{B}$ starts by running $\mathcal{A}$. When $\mathcal{A}$ outputs DB=$(T_1, \ldots, T_n)$, $\mathcal{B}$ creates a dictionary DX, a column multi-map MM$_C$, a row multi-map MM$_R$, a value multi-map MM$_V$ and a set of multi-maps $\{MM_c\}_{c\in DB^T}$, from DB. $\mathcal{B}$ then outputs MM$_R$. Upon receiving EMM$_R^*$—from either a $\text{Real}_{\Sigma_{MM},\mathcal{B}}(k)$ experiment or an $\text{Ideal}_{\Sigma_{MM},\mathcal{B},S}(k)$ experiment—$\mathcal{B}$ sends ERD to $\mathcal{A}$, where $$EDB=(EMM_R^*,EMM_C,EMM_V,EDX),$$

with EMM$_C \leftarrow S_{MM}(\mathcal{L}_S^{mm}(MM_C))$, EMM$_V \leftarrow S_{MM}(\mathcal{L}_S^{mm}(MM_V))$, and EDX$\leftarrow S_{DX}(\mathcal{L}_S^{dx}(DX))$.

Whenever $\mathcal{A}$ outputs a normal form query q, $\mathcal{B}$ does the following. $\langle$ outputs $\mathcal{B}$ tbl(r), rrk(r)$\rangle$ as its own query to EMM$_R^*$ and receives rtk$_r^*$. It then sends to $\mathcal{A}$ the token $$tk=(t,s,(e_i)_{i\in[f]}^*,(ytk_i)_{i\in[h]}^*,(\text{stk}_i)_{i\in[\ell]}),$$

where t is the number of queried tables, $s=Z=\Sigma_{j=1}^q\|T_i\|_c$ and for all $i\in[f]$, $e_i \leftarrow Enc_{K_1}(\alpha_i)$. If $a_i \in \mathbb{S}$ (DB), $$ytk_i:=ptk_i \leftarrow S_{MM}((ct_j)_{j\in[c]},AccP(a),\mathcal{L}_Q^{mm}(MM_C,$$
$$\langle tbl(a_i),crk(a_i)\rangle)).$$

Given AccP($a_i$), $ct_j$ is either equal to $Enc_{K_1}(c_j)$ if the column has not been accessed before, or the previously used ciphertext otherwise. If, on the other hand, $a_i \in \mathbb{S}$ (VDB), $ytk_i:=a_i$. For all $i\in[\ell]$, if $a_i=X_i$ is type-1, $stk_i:=vtk_i \leftarrow S_{MM}((rtk_r^*)^{r\in DB_{a_i=X_i}}, \mathcal{L}_Q^{mm}(MM_V, \langle tbl(a_i), crk(a_i)\rangle))$. If $a_i=X_i$ is type-2, then $stk_i=(dtk_i, jtk_i)$ such that $dtk_i \leftarrow S_{DX}$ (EMM$_{a_i}$, AccP(EMM$_{a_i}$), $\mathcal{L}_Q^{dx}(\langle tbl(a_i), crk(a_i)\rangle))$ where AccP(EMM$_{a_i}$) is a leakage that captures when and where EMM$_{a_i}$ was generated. Thus, it can be either equal to EMM$_{a_i} \leftarrow S_{MM}(\mathcal{L}_Q^{mm}(MM_{a_i}))$, or, a previously simulated one, and $$jtk_i \leftarrow S_{MM}(\{rtk_{r_1}^*,rtk_{r_2}^*\}^{(r_1,r_2)\in DB_{Loc_\psi[t]=x_i}},$$
$$\mathcal{L}_Q^{mm}(MM_{a_i}\langle tbl(a_i),tbl(X_i)\rangle)).$$

After answering all of $\mathcal{A}$'s queries, $\mathcal{A}$ outputs a bit which $\mathcal{B}$ returns as its own output. One skilled in the art of computing will understand that values other than "bits" may be used as well.

It may be noted that if $\mathcal{B}$ is executed in a $\text{Real}_{\Sigma_{MM},\mathcal{B}}(k)$ experiment then, by construction, $\mathcal{A}$'s view is substantially its view in Game$_{3+\#Loc_\psi}$. On the other hand, if $\mathcal{B}$ is executed in an $\langle$(k) experiment, then $\mathcal{A}$'s view is, by construction, substantially its view in Game$_{4+\#Loc_\psi}$. It follows by the initial assumption, as discussed above, that $$|Pr[\text{Real}_{\Sigma_{MM},\mathcal{B}}(k)=1]-Pr[\text{Ideal}_{\Sigma_{MM},\mathcal{B},S}(k)=1]|$$

is non-negligible, which is a contradiction.

Assertion. For all PPT adversaries $\mathcal{A}$, $$|Pr[\text{Game}_{4+\#Loc_\psi}=1]-Pr[\text{Game}_{5+\#Loc_\psi}=1]|<\text{negl}(k).$$

As discussed further below, if there exists a PPT adversary $\mathcal{A}$ that contradicts the assertion, then there exists a PPT adversary $\mathcal{B}$ that breaks the adaptive semantic security of SKE=(Gen, Enc, Dec) with respect to an arbitrary PPT simulator $S$. $\mathcal{B}$ starts by running $\mathcal{A}$. When $\mathcal{A}$ outputs DB=$(T_1, \ldots, T_n)$, $\mathcal{B}$ creates a dictionary DX, a column multi-map MM$_C$, a row multi-map MM$_R$, a value multi-map MM$_V$ and a set of multi-maps $\{MM_c\}_{c\in DB^T}$, from DB. $\mathcal{B}$ then outputs all messages m for all cells. Upon receiving ct* for all cells in DB—from either a $\text{Real}_{SKE,\mathcal{B}}(k)$ experiment or an $\text{Ideal}_{SKE,\mathcal{B},S}(k)$ experiment—$\mathcal{B}$ sends ERD to $\mathcal{A}$, where $$EDB=(EMM_R,EMM_C,EMM_V,EDX),$$

with EMM$_C \leftarrow S_{MM}(\mathcal{L}_S^{mm}(MM_C))$, EMM$_V \leftarrow S_{MM}(\mathcal{L}_S^{mm}(MM_V))$, and EDX$\leftarrow S_{DX}(\mathcal{L}_S^{dx}(DX))$ and EMM$_R \leftarrow S_{MM}(\mathcal{L}_S^{mm}(MM_R))$.

Whenever $\mathcal{A}$ outputs a query $\chi$, $\mathcal{B}$ does the following. For all $i\in[f]$, $\mathcal{B}$ outputs $\alpha_i$ and receives $e_i^*$. It then sends to $\mathcal{A}$ the token $$tk=(t,s,(e_i)_{i\in[f]}^*,(ytk_i)_{i\in[h]},(\text{stk}_i)_{i\in[\ell]});$$

where t is the number of queried tables, $s=\Sigma_{j=1}^q\|T_i\|_c$. If $a_i \in \mathbb{S}$ (DB), $$ytk_i:=ptk_i \leftarrow S_{MM}((ct_j^*)_{j\in[\#c]},AccP(a_i),\mathcal{L}_Q^{mm}(MM_C,$$
$$\langle tbl(a_i),crk(a_i)\rangle)).$$

Given AccP($a_i$), $ct_j^*$ is either equal to a simulated ciphertext if the column has not been accessed before, or the previously used ciphertext otherwise. If, on the other hand, $a_i \in \mathbb{S}$ (VDB), $ytk_i:=a_i$. For all $i\in[\ell]$, if $a_i=X_i$ is type-1, $stk_i:=vtk_i \leftarrow S_{MM}((rtk_r)^{r\in DB_{a_i=X_i}}, \mathcal{L}_Q^{mm}(MM_V, \langle tbl(a_i), crk(a_i)\rangle))$. If $a_i=X_i$ is type-2, then $stk_i=(dtk_i, jtk_i)$ such that $dtk_i \leftarrow S_{DX}$ (EMM$_{a_i}$, AccP(EMM$_{a_i}$), $\mathcal{L}_Q^{dx}(\langle tbl(a_i), crk(a_i)\rangle))$ where AccP(EMM$_{a_i}$) is a leakage that captures when and where EMM$_{a_i}$ was generated. Thus, it can be either equal to EMM$_{a_i} \leftarrow S_{MM}(\mathcal{L}_Q^{mm}(MM_{a_i}))$, or, a previously simulated one, and $$jtk_i \leftarrow S_{MM}(\{rtk_{r_1},rtk_{r_2}\}^{(r_1,r_2)\in DB_{Loc_\psi[t]=x_i}},\mathcal{L}_Q^{mm}(M-$$
$$M_{a_i}\langle tbl(a_i),tbl(X_i)\rangle)),$$

where rtk$_r$ in both cases above is denoted as $$rtk_r \leftarrow S_{MM}((ct_j^*)_{j\in[\#r]},AccP(r),\mathcal{L}_Q^{mm}(MM_R,\langle tbl(r),$$
$$rrk(r)\rangle)),$$

where AccP(r) captures when and where r has been queried. Thus, $ct_j^*$ can be either freshly generated, or, re-used from a previously generated one.

After answering all of $\mathcal{A}$'s queries, $\mathcal{A}$ outputs a bit which $\mathcal{B}$ returns as its own output. One skilled in the art of computing will understand that values other than "bits" may be used as well.

It may be noted that if $\mathcal{B}$ is executed in a $\text{Real}_{SKE,\mathcal{B}}(k)$ experiment then, by construction, $\mathcal{A}$'s view is substantially its view in Game$_{4+\#Loc_\psi}$. On the other hand, if $\mathcal{B}$ is executed in an $\text{Ideal}_{SKE,\mathcal{B},S}(k)$ experiment, then $\mathcal{A}$'s view is, by construction, substantially its view in Game$_{5+\#Loc_\psi}$. It follows by the initial assumption, as discussed above, that $$|Pr[\text{Real}_{SKE,\mathcal{B}}(k)=1]-Pr[\text{Ideal}_{SKE,\mathcal{B},S}(k)=1]|$$

is non-negligible, which is a contradiction.

Assertion. For all PPT adversaries $\mathcal{A}$, $$|Pr[\text{Game}_{5+\#Loc_\psi}=1]=Pr[\text{Game}_{6+\#Loc_\psi}=1]|.$$

In accordance with the discussion above, it may be shown that the view of both of these games is substantially the same.

In addition to the basic Select-From-Where structure, SQL queries may also include additional clauses to post-process the results of a query. Some examples include the Group-by, Order-by, and various aggregate functions which include Sum, Average, Median, Count, Mode, Max, and Min. Further, SQL queries may be referred to with such additional terms as extended queries. Though a particular implementation may not handle extended queries explicitly, the additional clauses may, for example, be executed at the client. In cases where the result table R is such that $\|R\|_r \ll \sum_{i=1}^{n} \|T_i\|_r$, outsourcing a database with SPX may still be less computationally-expensive than executing the queries locally.

The Order-by clause orders the rows in the result table R according to a specified attribute in either ascending or descending order. These queries may be of the form:

Select attributes From tables Where conditions Order-by attribute.

Ordering R at the client may be done in O(m log m) time where m=$\|R\|_r$. It may be noted that the client may perform O(m) work just to decrypt the result table so, asymptotically-speaking, ordering R may not seem substantially advantageous. In practice, however, Order-by operations may be performed on integer or string columns, and in the latter case this may be somewhat expensive if the strings are long. However, as an example optimization, the client may compute the order of the rows during the setup phase and may add a column that includes a CPA-secure encryption of each row's order. When the client retrieves the result-table R it may then decrypt the column and order the rows using a numerical sorting technique (i.e., as opposed to a lexicographic sorting technique).

Another common SQL clause is Group-by which may be used to partition the rows in the result table by a specified attribute. For example, Group-by may be used with aggregate functions (e.g., Sum, Max, etc.). For example, such queries may be indicated as:

Select attributes attributes From tables Where conditions Group-by attributes.

For example, Group-by clauses may be handled at the client in O(m) time, where m=$\|R\|_r$.

As an example of aggregates, computing a function on the rows of the result table (e.g., computing a sum of salaries from employee table) may be handled, in SQL, with an aggregate function. For example, a query with the Sum function may be indicated as:

Select Sum(attribute) From tables Where conditions.

Some aggregates may be handled by the server by extending SPX in a natural way. For example, to handle Count the server may simply return the number of rows in the encrypted result table ET. To handle Sum on a given attribute a, it may suffice to encrypt the cells of that column with an additively-homomorphic encryption scheme and have the server return the sum of the resulting column. For example, the remaining functions (e.g., Max, Min, Median, Mode) may be handled at the client.

One skilled in the art of computing will understand that other instructions or operations may also be used to achieve this (or similar) functionality, without departing from the discussion herein.

II. Example Operating Environment

Features discussed herein are provided as example embodiments that may be implemented in many different ways that may be understood by one of skill in the art of computing, without departing from the discussion herein. Such features are to be construed only as example embodiment features, and are not intended to be construed as limiting to only those detailed descriptions.

FIG. 5 illustrates an example of a suitable computing system environment 500 on which aspects of the subject matter discussed herein may be implemented (e.g., the EDBMS). The computing system environment 500 is only one example of a suitable computing environment and is not intended to suggest any limitation as to the scope of use or functionality of aspects of the subject matter discussed herein. Neither should the computing environment 500 be interpreted as having any dependency or requirement relating to any one or combination of components illustrated in the example operating environment 500.

Aspects of the subject matter discussed herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like. While various embodiments may be limited to one or more of the above devices, the term computer is intended to cover the devices above unless otherwise indicated.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 5, an example system for implementing aspects of the subject matter discussed herein includes a general-purpose computing device in the form of a computer 510. A computer may include any electronic device that is capable of executing an instruction. Components of the computer 510 may include a processing unit 520, a system memory 530, and one or more system buses (represented by system bus 521) that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media.

Computer storage media (or "computer-readable storage media") includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs), Blu-ray Disc (BD) or other optical disk storage (e.g., Universal Serial Bus (USB) drive, hard disk drive), magnetic cassettes, magnetic tape, magnetic disk storage or other magnetic storage devices, or any other medium which can be used to store the desired information and which can be accessed by the computer 510. "Computer storage media" does not include "communication media." Thus, as used herein, the term "computer-readable storage medium" is not a signal per se, nor any type of propagating signal per se.

"Communication media" typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 530 may include computer storage media in the form of volatile and/or nonvolatile memory such as read only memory (ROM) 531 and random access memory (RAM) 532. Nonvolatile memory may be substituted for some or all of the ROM 531 and/or the RAM 532. For example, memristor memory, phase-change memory (PCM), or some other type of nonvolatile memory may be used instead of, or in addition to, the ROM 531 and/or the RAM 532.

A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disc drive 555 that reads from or writes to a removable, nonvolatile optical disc 556 such as a CD ROM, DVD, BD, or other optical media.

In one implementation, memristor memory, phase-change memory, or some other type of nonvolatile memory may be used instead of, or in addition to, the hard drive 541.

Other removable/non-removable, volatile/nonvolatile computer storage media (or "computer-readable storage media") that can be used in the exemplary operating environment include magnetic tape cassettes, flash memory cards and other solid state storage devices, digital versatile discs, other optical discs, digital video tape, solid state RAM, solid state ROM, and the like. The hard disk drive 541 may be connected to the system bus 521 through the interface 140, and magnetic disk drive 551 and optical disc drive 555 may be connected to the system bus 521 by an interface for removable nonvolatile memory such as the interface 550.

The drives and their associated computer storage media, discussed above and illustrated in FIG. 5, provide storage of computer-readable instructions, data structures, program modules, and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers herein to illustrate that they may be different copies.

A user may enter commands and information into the computer 510 through input devices such as a keyboard 562 and pointing device 561, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 520 through a user input interface 560 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include phone networks, near field networks, and other networks. Such networking environments are commonplace in offices, enterprise-wide computer networks, intranets, and the Internet.

When used in a LAN networking environment, the computer 510 is connected to the LAN 571 through a network interface or adapter 570. When used in a WAN networking environment, the computer 510 may include a modem 572 or other means for establishing communications over the WAN 573, such as the Internet. The modem 572, which may be internal or external, may be connected to the system bus 521 via the user input interface 560 or other appropriate mechanism. In a networked environment, program modules depicted relative to the computer 510, or portions thereof, may be stored in the remote memory storage device. By way of example, and not limitation, FIG. 5 illustrates remote application programs (RAP) 585 as residing on memory device 581. It will be appreciated that the network connections shown are exemplary and other means of establishing a communications link between the computers may be used.

In this context, a "processor" may include a single processor or multiple processors configured to process instructions associated with a computing system. A processor may thus include one or more processors executing instructions in parallel and/or in a distributed manner. For example, the system shown in FIG. 5 may include one or more processors (e.g., hardware processors).

For example, a system may include at least one hardware device processor, and a computer-readable storage medium storing executable instructions for execution by the device processor, for implementing an EDBMS as discussed herein.

For example, a system may include at least one hardware device processor, and a computer-readable storage medium storing executable instructions that, when executed, cause one or more of the at least one hardware device processor to control secure processing of queries in a relational database.

A secure query may be generated based on generating an encrypted token using a structured query language (SQL) query in a conjunctive query form, using structured encryption, in lieu of using property-preserving encryption (PPE), the encrypted token including an arity value indicating a cardinality of tables included in a cross product portion of the query and a dimension value indicating dimensions of the tables included in the cross product.

The secure query may be submitted to a device that hosts an encrypted database that comprises encrypted multi-maps corresponding to the relational database, and an encrypted dictionary based on structured encryption. An encrypted response to the secure query may be received.

For example, the encrypted database may be generated at a client device by generating the encrypted multi-maps corresponding to the relational database and the encrypted dictionary using structured encryption, in lieu of using property-preserving encryption (PPE), the encrypted multi-maps including a row-wise multi-map storing an encrypted row-wise representation of the relational database, and a column-wise multi-map storing an encrypted column-wise representation of the relational database.

For example, the encrypted database may be transmitted from the client device to the device that hosts the encrypted database.

For example, the encrypted multi-maps may include a value-wise multi-map storing an encrypted mapping of a plurality of values of cells to respective tokens for respective rows of the relational database that respectively store the same respective values.

For example, the encrypted database may be generated at a client device by generating a dictionary that identifies correspondences between labels and respective values corresponding to the respective labels.

For example, an encrypted version of the dictionary may be transmitted from the client device to the device that hosts the encrypted database.

For example, the encrypted database may be generated at a client device by generating the encrypted multi-maps corresponding to the relational database and the encrypted dictionary using structured encryption, in lieu of using property-preserving encryption (PPE), wherein the encrypted multi-maps include one or more inverted indexes.

For example, the encrypted database may be transmitted from the client device to a server that is included in the device that hosts the encrypted database.

For example, the encrypted database may be generated at a client device by generating the encrypted multi-maps corresponding to the relational database and the encrypted dictionary using structured encryption, in lieu of using property-preserving encryption (PPE). The encrypted multi-maps may include a value-wise multi-map that stores a value-wise representation of the relational database in encrypted form, the value-wise representation representing mappings of values of cells to rows in the relational database that store respective values in common with the respective cells.

The encrypted database may be transmitted from the client device to a server that is included in the device that hosts the encrypted database.

For example, the secure query may be generated based on generating the encrypted token using a structured query language (SQL) query in selection, projection, and Cartesian product (SPC) normal form, using structured encryption, in lieu of using property-preserving encryption (PPE), and in lieu of using fully homomorphic encryption (FHE), and in lieu of using trusted hardware.

For example, the SQL query may be obtained from an application that is hosted on a client device.

For example, the received encrypted response to the SQL query may be decrypted.

For example, the decrypted received response may be provided to the application.

For example, receiving the encrypted response to the SQL query may include receiving an encrypted table.

For example, respective cells in the received encrypted table may be decrypted to generate a decrypted query result.

In another aspect, controlling secure processing of queries in a relational database may be controlled by receiving, from a client device, a secure query in a format of an encrypted token generated using a structured query language (SQL) query in a conjunctive query form, the encrypted token including an arity value indicating a cardinality of tables included in a cross product portion of the query and a dimension value indicating dimensions of the tables included in the cross product.

An encrypted response to the secure query may be generated using an encrypted database that comprises encrypted multi-maps corresponding to the relational database and an encrypted dictionary based on structured encryption, using structured encryption, in lieu of using property-preserving encryption (PPE), and in lieu of using fully homomorphic encryption (FHE). The encrypted response may be sent to the client device.

The encrypted database may be received at a server device, from the client device.

For example, sending the encrypted response to the client device may include sending an encrypted table to the client device.

For example, generating the encrypted response to the secure query may include generating the encrypted response without decrypting the secure query and without decrypting the encrypted database.

For example, the encrypted multi-maps may include a row-wise multi-map that stores a row-wise representation of the relational database in encrypted form.

For example, the encrypted multi-maps may include a column-wise multi-map that stores a column-wise representation of the relational database in encrypted form.

For example, the encrypted multi-maps may include a value-wise multi-map that stores a value-wise representation of the relational database in encrypted form, the value-wise representation representing mappings of values of cells to rows in the relational database that store respective values in common with the respective cells.

In another aspect, a system may include at least one server that includes at least one hardware device processor, and an encrypted relational database that includes encrypted multi-maps corresponding to a relational database hosted at a client device, and an encrypted dictionary, based on structured encryption, using structured encryption, in lieu of using property-preserving encryption (PPE), and in lieu of using fully homomorphic encryption (FHE).

A security controller may include a computer-readable storage medium storing executable instructions that, when executed, cause one or more of the at least one hardware device processor to control secure processing of queries in the encrypted relational database.

The security controller may include a query controller that receives, from the client device, a secure query in a format of an encrypted token generated using a structured query language (SQL) query in a conjunctive query form, and sends an encrypted response to the secure query to the client device.

The query controller may include a search engine that generates the encrypted response to the secure query by initiating a search on the encrypted relational database, without decrypting the secure query and without decrypting the encrypted multi-maps.

For example, the encrypted multi-maps may include a value-wise multi-map that stores a value-wise representation of the relational database in encrypted form, the value-wise representation representing mappings of values of cells to rows in the relational database that store respective values in common with the respective cells.

For example, the encrypted multi-maps may include a value-wise multi-map storing an encrypted mapping of a plurality of values of cells to respective tokens for respective rows of the relational database that respectively store the same respective values.

For example, the received secure query may include the encrypted token generated using a structured query language (SQL) query in selection, projection, and Cartesian product (SPC) normal form, using structured encryption, in lieu of using property-preserving encryption (PPE), and in lieu of using fully homomorphic encryption (FHE).

One skilled in the art of computing will appreciate that many different techniques may be used for implementing features discussed herein.

III. Flowchart Description

Features discussed herein are provided as example embodiments that may be implemented in many different ways that may be understood by one of skill in the art of computing, without departing from the discussion herein. Such features are to be construed only as example embodiment features, and are not intended to be construed as limiting to only those detailed descriptions.

Figure 6A:
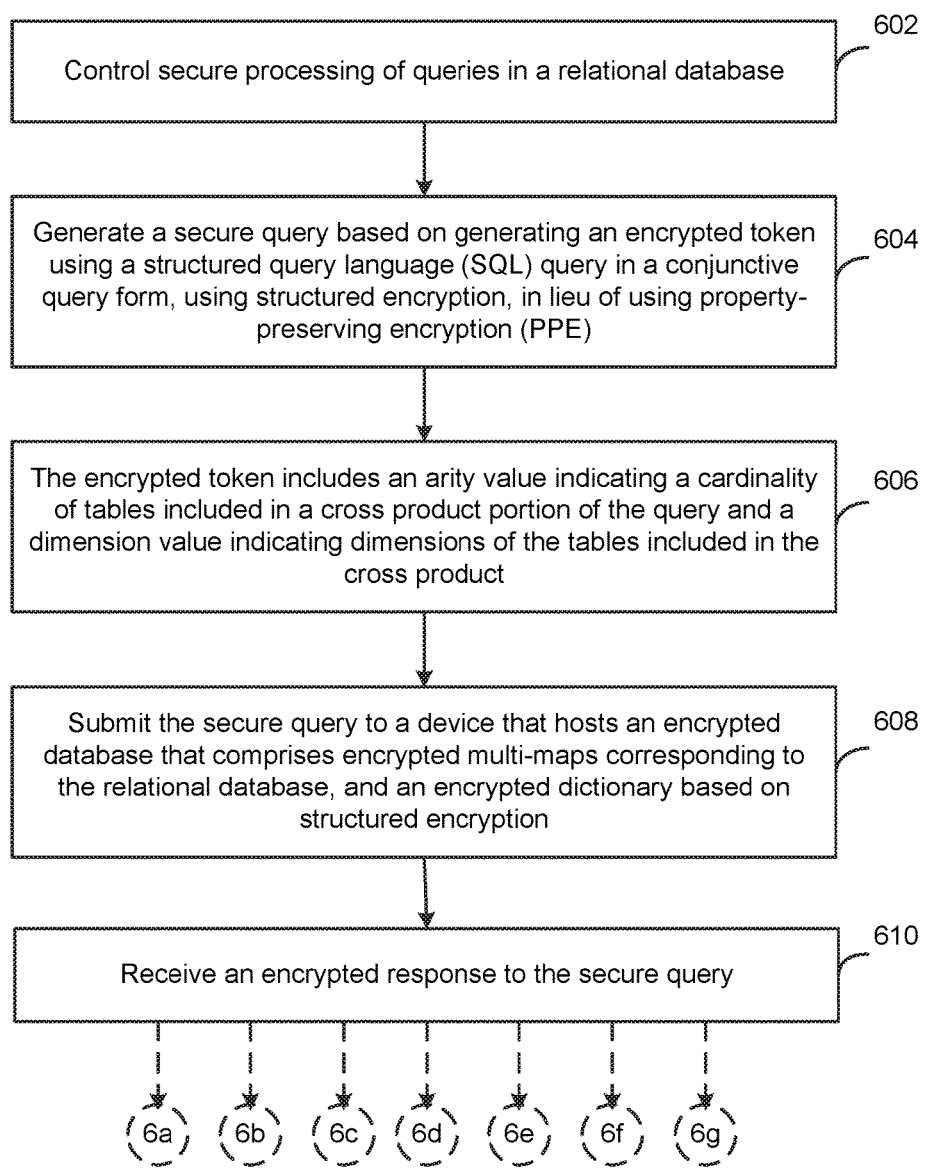
FIGS. 6A-6D are a flowchart illustrating example operations of the system of FIG. 5.

FIGS. 6A-6D are a flowchart illustrating example operations of the system of FIG. 5, according to example embodiments. As shown in the example of FIG. 6A, secure processing of queries in a relational database is controlled (602). A secure query is generated based on generating an encrypted token using a structured query language (SQL) query in a conjunctive query form, using structured encryption, in lieu of using property-preserving encryption (PPE) (604).

The encrypted token includes an arity value indicating a cardinality of tables included in a cross product portion of the query and a dimension value indicating dimensions of the tables included in the cross product (606).

The secure query is submitted to a device that hosts an encrypted database that comprises encrypted multi-maps corresponding to the relational database, and an encrypted dictionary based on structured encryption (608). An encrypted response to the secure query is received (610).

Figure 6B:
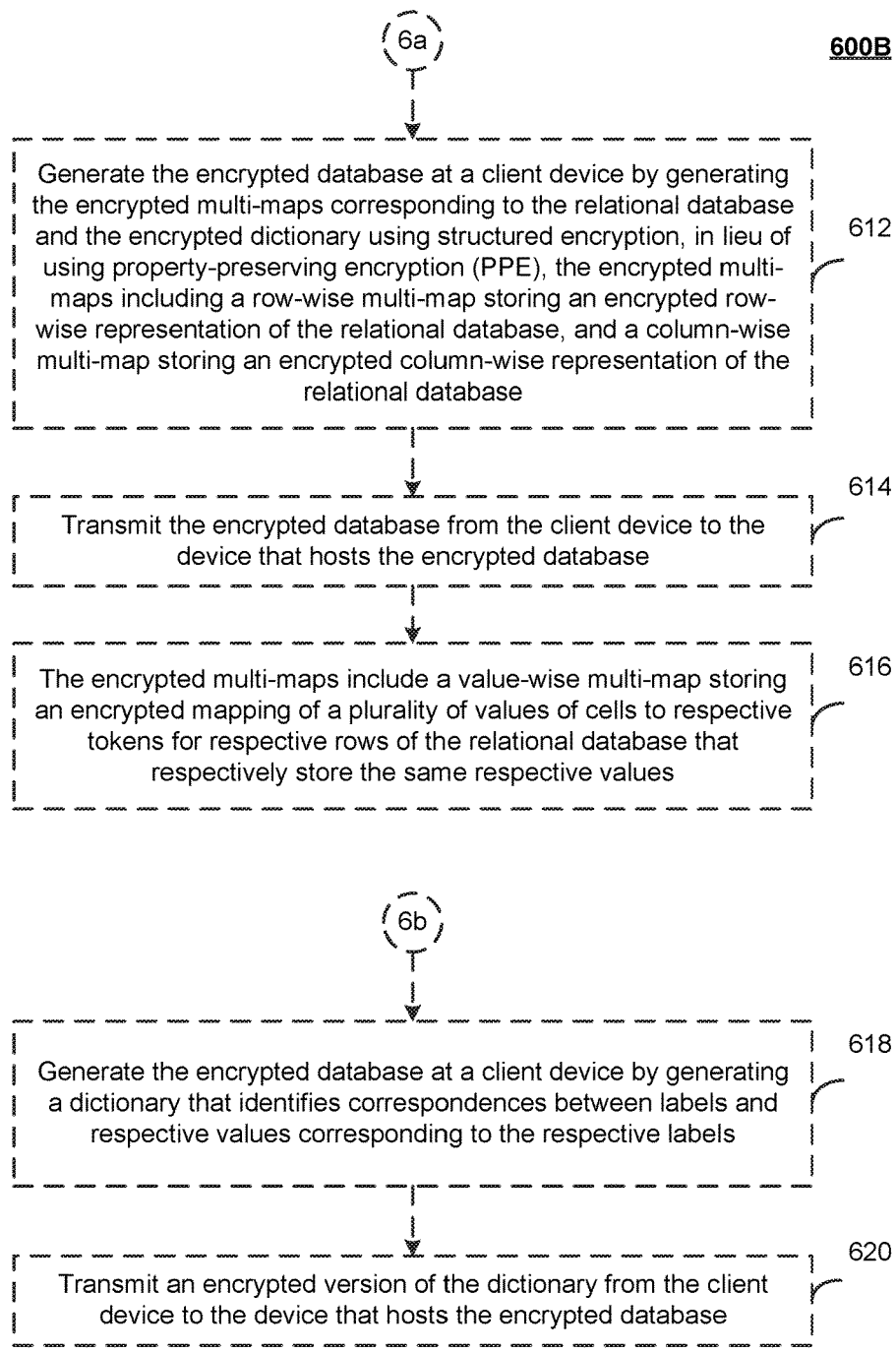

For example, the encrypted database may be generated at a client device by generating the encrypted multi-maps corresponding to the relational database and the encrypted dictionary using structured encryption, in lieu of using property-preserving encryption (PPE), the encrypted multi-maps including a row-wise multi-map storing an encrypted row-wise representation of the relational database, and a column-wise multi-map storing an encrypted column-wise representation of the relational database (612), in FIG. 6B.

For example, the encrypted database may be transmitted from the client device to the device that hosts the encrypted database (614).

For example, the encrypted multi-maps may include a value-wise multi-map storing an encrypted mapping of a plurality of values of cells to respective tokens for respective rows of the relational database that respectively store the same respective values (616).

For example, the encrypted database may be generated at a client device by generating a dictionary that identifies correspondences between labels and respective values corresponding to the respective labels (618).

For example, an encrypted version of the dictionary may be transmitted from the client device to the device that hosts the encrypted database (620).

Figure 6C:
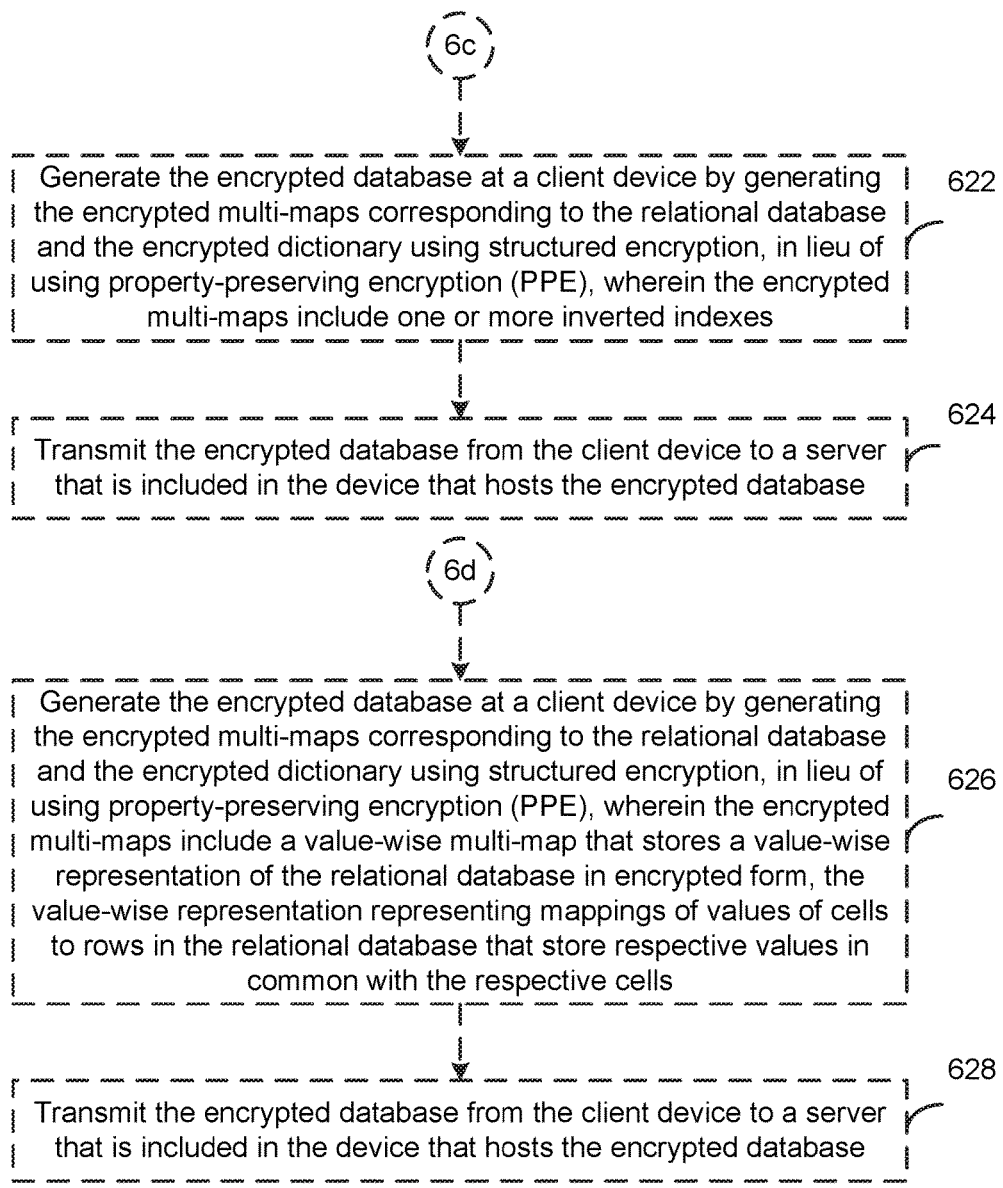

For example, the encrypted database may be generated at a client device by generating the encrypted multi-maps corresponding to the relational database and the encrypted dictionary using structured encryption, in lieu of using property-preserving encryption (PPE), wherein the encrypted multi-maps include one or more inverted indexes (622), in FIG. 6C.

For example, the encrypted database may be transmitted from the client device to a server that is included in the device that hosts the encrypted database (624).

For example, the encrypted database may be generated at a client device by generating the encrypted multi-maps corresponding to the relational database and the encrypted dictionary using structured encryption, in lieu of using property-preserving encryption (PPE), wherein the encrypted multi-maps include a value-wise multi-map that stores a value-wise representation of the relational database in encrypted form, the value-wise representation representing mappings of values of cells to rows in the relational database that store respective values in common with the respective cells (626).

For example, the encrypted database may be transmitted from the client device to a server that is included in the device that hosts the encrypted database (628).

Figure 6D:
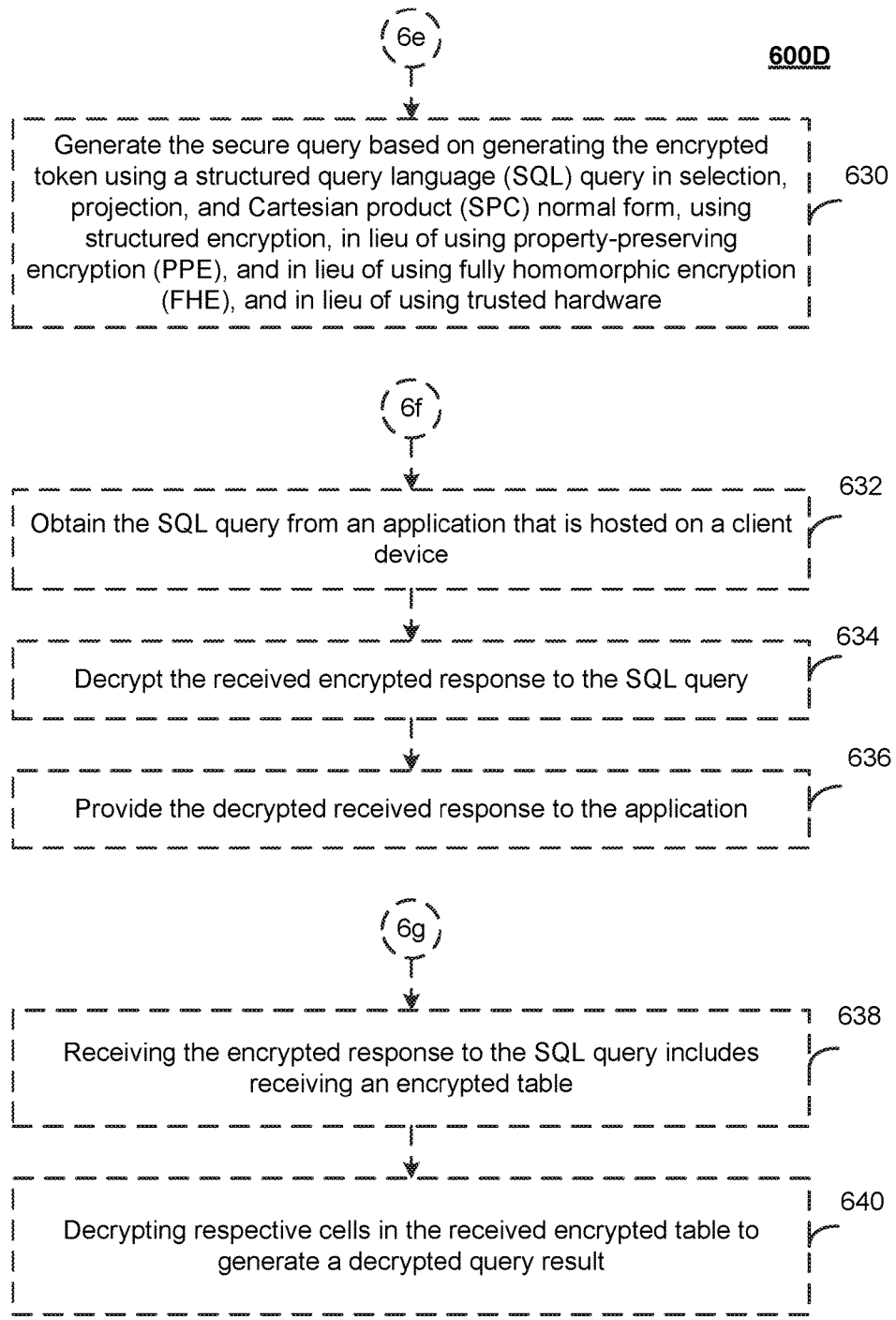

For example, the secure query may be generated based on generating the encrypted token using a structured query language (SQL) query in selection, projection, and Cartesian product (SPC) normal form, using structured encryption, in lieu of using property-preserving encryption (PPE), and in lieu of using fully homomorphic encryption (FHE), and in lieu of using trusted hardware (630), in FIG. 6D.

For example, the SQL query may be obtained from an application that is hosted on a client device (632).

For example, the received encrypted response to the SQL query may be decrypted (634).

For example, the decrypted received response may be provided to the application (636).

For example, receiving the encrypted response to the SQL query may include receiving an encrypted table (638).

For example, respective cells in the received encrypted table may be decrypted to generate a decrypted query result (640).

Figure 7A:
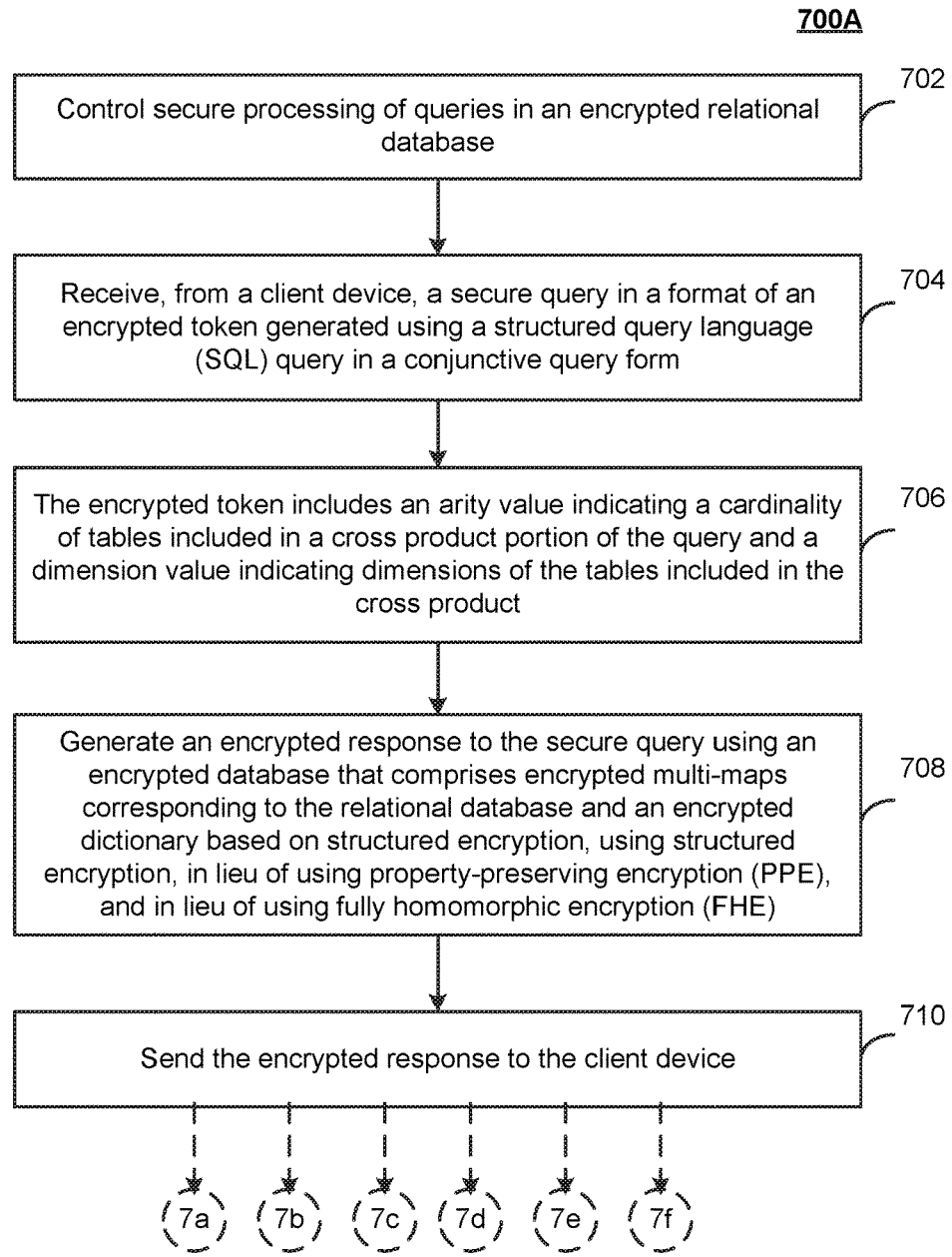

FIGS. 7A-7C are a flowchart illustrating example operations of the system of FIG. 5, according to example embodiments. As shown in the example of FIG. 7A, secure processing of queries in an encrypted relational database is controlled (702). A secure query in a format of an encrypted token generated using a structured query language (SQL) query in a conjunctive query form is received from a client device (704).

The encrypted token includes an arity value indicating a cardinality of tables included in a cross product portion of the query and a dimension value indicating dimensions of the tables included in the cross product (706).

An encrypted response to the secure query is generated using an encrypted database that comprises encrypted multi-maps corresponding to the relational database and an encrypted dictionary based on structured encryption, using structured encryption, in lieu of using property-preserving encryption (PPE), and in lieu of using fully homomorphic encryption (FHE) (708). The encrypted response is sent to the client device (710).

For example, the encrypted database may be received at a server device, from the client device (712), in FIG. 7B.

For example, sending the encrypted response to the client device may include sending an encrypted table to the client device (714).

For example, generating the encrypted response to the secure query may include generating the encrypted response without decrypting the secure query and without decrypting the encrypted database (716).

For example, the encrypted multi-maps may include a row-wise multi-map that stores a row-wise representation of the relational database in encrypted form (718).

For example, the encrypted multi-maps may include a column-wise multi-map that stores a column-wise representation of the relational database in encrypted form (720), in FIG. 7C.

For example, the encrypted multi-maps may include a value-wise multi-map that stores a value-wise representation of the relational database in encrypted form, the value-wise representation representing mappings of values of cells to rows in the relational database that store respective values in common with the respective cells (722).

Figure 8A:
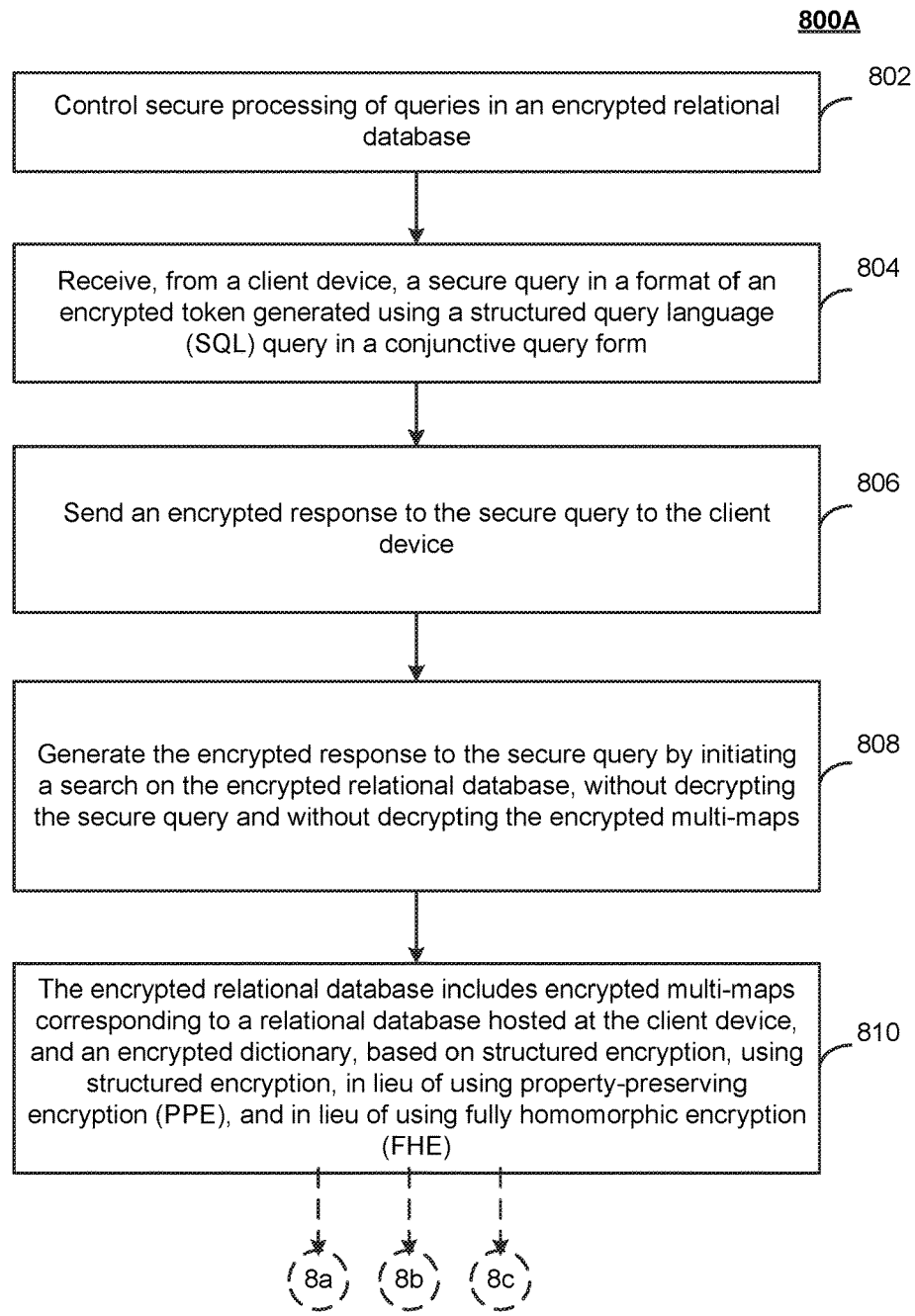
FIGS. 8A-8B are a flowchart illustrating example operations of the system of FIG. 5.
Figure 8B:
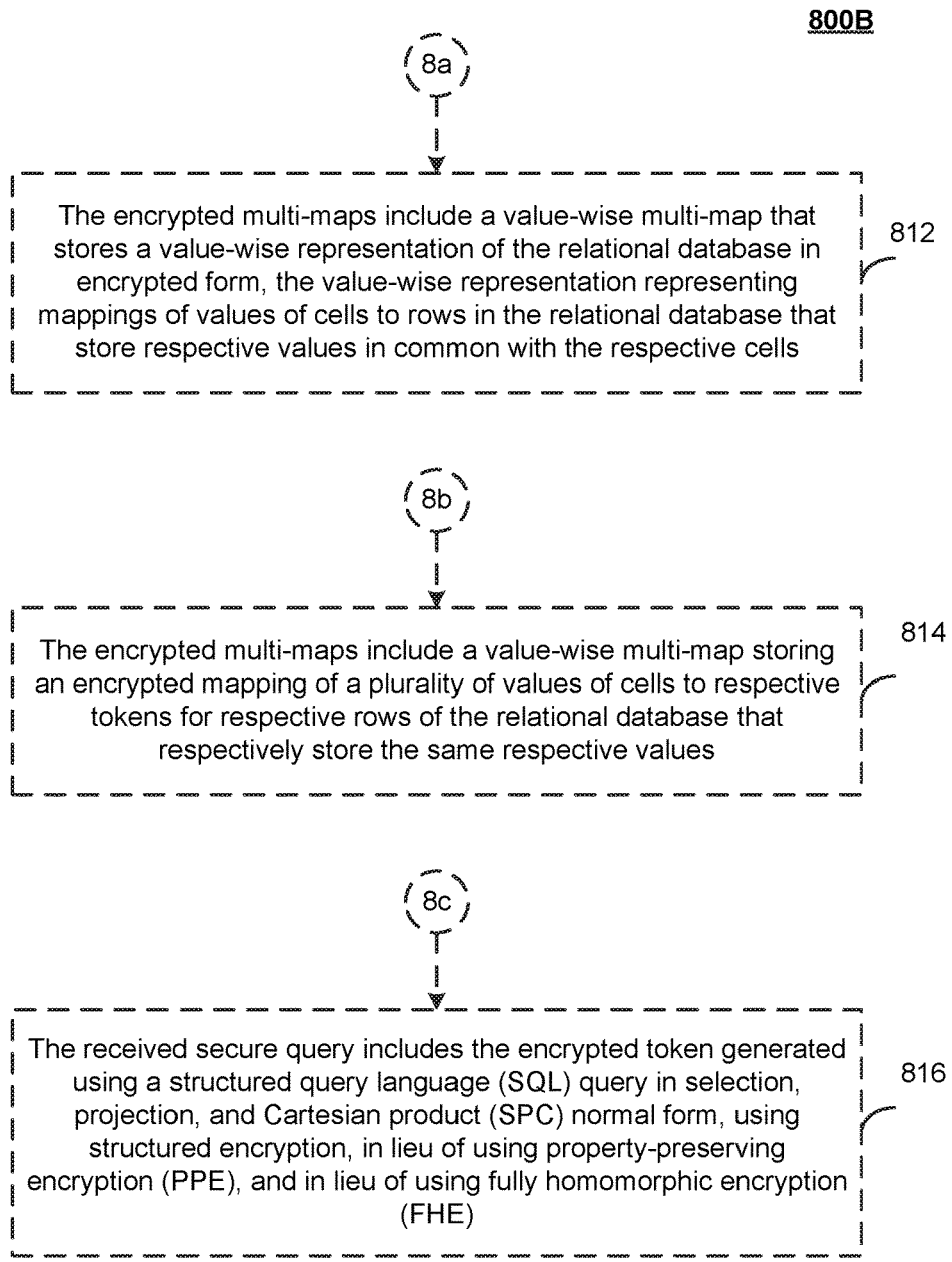

FIGS. 8A-8B are a flowchart illustrating example operations of the system of FIG. 5, according to example embodiments. As shown in the example of FIG. 8A, secure processing of queries in an encrypted relational database is controlled (802). A secure query in a format of an encrypted token generated using a structured query language (SQL) query in a conjunctive query form is received from a client device (804). An encrypted response to the secure query is sent to the client device (806).

The encrypted response to the secure query is generated by initiating a search on the encrypted relational database, without decrypting the secure query and without decrypting the encrypted multi-maps (808).

The encrypted relational database includes encrypted multi-maps corresponding to a relational database hosted at the client device, and an encrypted dictionary, based on structured encryption, using structured encryption, in lieu of using property-preserving encryption (PPE), and in lieu of using fully homomorphic encryption (FHE) (810).

For example, the encrypted multi-maps may include a value-wise multi-map that stores a value-wise representation of the relational database in encrypted form, the value-wise representation representing mappings of values of cells to rows in the relational database that store respective values in common with the respective cells (812), in FIG. 8B.

For example, the encrypted multi-maps may include a value-wise multi-map storing an encrypted mapping of a plurality of values of cells to respective tokens for respective rows of the relational database that respectively store the same respective values (814).

For example, the received secure query may include the encrypted token generated using a structured query language (SQL) query in selection, projection, and Cartesian product (SPC) normal form, using structured encryption, in lieu of using property-preserving encryption (PPE), and in lieu of using fully homomorphic encryption (FHE) (816).

One skilled in the art of computing will appreciate that many other types of techniques may be used for controlling security in relational databases, without departing from the discussion herein.

Features discussed herein are provided as example embodiments that may be implemented in many different ways that may be understood by one of skill in the art of computing, without departing from the discussion herein. Such features are to be construed only as example embodiment features, and are not intended to be construed as limiting to only those detailed descriptions.

In this context, a "processor" may include a single processor or multiple processors configured to process instructions associated with a computing system. A processor may thus include one or more processors executing instructions in parallel and/or in a distributed manner.

For example, the system 500 may include one or more processors. For example, the system 500 may include at least one tangible computer-readable storage medium (e.g., an article of manufacture) storing instructions executable by the one or more processors, the executable instructions configured to cause at least one processor to perform operations associated with various example components included in the system 500, as discussed herein. For example, the one or more processors may be included in at least one processing apparatus. One skilled in the art of computing will understand that there are many configurations of processors and processing apparatuses that may be configured in accordance with the discussion herein, without departing from such discussion.

In this context, a "component" or "module" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components). For example, a "component" herein may refer to a type of functionality that may be implemented by instructions that may be located in a single entity, or may be spread or distributed over multiple entities, and may overlap with instructions and/or hardware associated with other components.

In this context, a "memory" may include a single memory device or multiple memory devices configured to store data and/or instructions. Further, the memory may span multiple distributed storage devices. Further, the memory may be distributed among a plurality of processors.

One skilled in the art of computing will understand that there may be many ways of accomplishing the features discussed herein.

Customer privacy and confidentiality have been ongoing considerations in computing environments for many years. Thus, example techniques for maintaining a database may use user input and/or data provided by users who have provided permission via one or more subscription agreements (e.g., "Terms of Service" (TOS) agreements) with associated applications or services associated with such techniques. For example, users may provide consent to have their input/data transmitted and stored on devices, though it may be explicitly indicated (e.g., via a user accepted agreement) that each party may control how transmission and/or storage occurs, and what level or duration of storage may be maintained, if any. Further, identifiers that may be used to identify devices used by a user may be obfuscated, e.g., by hashing actual user information. It is to be understood that any user input/data may be obtained in accordance with the privacy laws and regulations of any relevant jurisdiction.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in signals (e.g., a pure signal such as a pure propagated signal). Such implementations will be referred to herein as implemented via a "computer-readable transmission medium," which does not qualify herein as a "computer-readable storage medium" or a "computer-readable storage device" as discussed below.

Alternatively, implementations may be implemented via a machine usable or machine readable storage device (e.g., a magnetic or digital medium such as a Universal Serial Bus (USB) storage device, a tape, hard disk drive, compact disk (CD), digital video disk (DVD), etc.), storing executable instructions (e.g., a computer program), for execution by, or to control the operation of, a computing apparatus (e.g., a data processing apparatus), e.g., a programmable processor, a special-purpose processor or device, a computer, or multiple computers. Such implementations may be referred to herein as implemented via a "computer-readable storage medium" or a "computer-readable storage device" and are thus different from implementations that are purely signals such as pure propagated signals (and thus do not qualify herein as a "computer-readable transmission medium" as discussed above). Thus, as used herein, a reference to a "computer-readable storage medium" or a "computer-readable storage device" specifically excludes reference to media and devices that are signals (e.g., propagated signals) per se.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one hardware device processor; and
   a computer-readable storage medium storing executable instructions that, when executed, cause one or more of the at least one hardware device processor to:
   control secure processing of queries in a relational database by:
   generating a secure query based on generating an encrypted token using a structured query language (SQL) query in a conjunctive query form, using structured encryption, in lieu of using property-preserving encryption (PPE), the encrypted token including an arity value indicating a cardinality of tables included in a cross product portion of the query and a dimension value indicating dimensions of the tables included in the cross product; and
   submitting the secure query to a device that hosts an encrypted database that comprises encrypted multi-maps corresponding to the relational database, and an encrypted dictionary based on structured encryption; and
   receiving an encrypted response to the secure query.

2. The system of claim 1, wherein:
   controlling the secure processing of queries in the relational database includes:
   generating the encrypted database at a client device by generating the encrypted multi-maps corresponding to the relational database and the encrypted dictionary using structured encryption, in lieu of using property-preserving encryption (PPE), the encrypted multi-maps including a row-wise multi-map storing an encrypted row-wise representation of the relational database, and a column-wise multi-map storing an encrypted column-wise representation of the relational database; and
   transmitting the encrypted database from the client device to the device that hosts the encrypted database.

3. The system of claim 2, wherein:
   the encrypted multi-maps include a value-wise multi-map storing an encrypted mapping of a plurality of values of cells to respective tokens for respective rows of the relational database that respectively store the same respective values.

4. The system of claim 1, wherein:
   controlling the secure processing of queries in the relational database includes:
   generating the encrypted database at a client device by generating a dictionary that identifies correspondences between labels and respective values corresponding to the respective labels; and
   transmitting an encrypted version of the dictionary from the client device to the device that hosts the encrypted database.

5. The system of claim 1, wherein:
   controlling the secure processing of queries in the relational database includes:
   generating the encrypted database at a client device by generating the encrypted multi-maps corresponding to the relational database and the encrypted dictionary using structured encryption, in lieu of using property-preserving encryption (PPE), wherein the encrypted multi-maps include one or more inverted indexes; and
   transmitting the encrypted database from the client device to a server that is included in the device that hosts the encrypted database.

6. The system of claim 1, wherein:
   controlling the secure processing of queries in the relational database includes:
   generating the encrypted database at a client device by generating the encrypted multi-maps corresponding to the relational database and the encrypted dictionary using structured encryption, in lieu of using property-preserving encryption (PPE), wherein the encrypted multi-maps include a value-wise multi-map that stores a value-wise representation of the relational database in encrypted form, the value-wise representation representing mappings of values of cells to rows in the relational database that store respective values in common with the respective cells; and transmitting the encrypted database from the client device to a server that is included in the device that hosts the encrypted database.

7. The system of claim 1, wherein:
controlling the secure processing of queries in the relational database includes:
generating the secure query based on generating the encrypted token using a structured query language (SQL) query in selection, projection, and Cartesian product (SPC) normal form, using structured encryption, in lieu of using property-preserving encryption (PPE), and in lieu of using fully homomorphic encryption (FHE), and in lieu of using trusted hardware.

8. The system of claim 1, wherein:
controlling the secure processing of queries in the relational database includes:
obtaining the SQL query from an application that is hosted on a client device;
decrypting the received encrypted response to the SQL query; and
providing the decrypted received response to the application.

9. The system of claim 1, wherein:
receiving the encrypted response to the SQL query includes receiving an encrypted table, wherein controlling the secure processing of queries in the relational database includes:
decrypting respective cells in the received encrypted table to generate a decrypted query result.

10. A method comprising:
controlling secure processing of queries in a relational database by:
receiving, from a client device, a secure query in a format of an encrypted token generated using a structured query language (SQL) query in a conjunctive query form, the encrypted token including an arity value indicating a cardinality of tables included in a cross product portion of the query and a dimension value indicating dimensions of the tables included in the cross product;
generating an encrypted response to the secure query using an encrypted database that comprises encrypted multi-maps corresponding to the relational database and an encrypted dictionary based on structured encryption, using structured encryption, in lieu of using property-preserving encryption (PPE), and in lieu of using fully homomorphic encryption (FHE); and
sending the encrypted response to the client device.

11. The method of claim 10, further comprising:
receiving, at a server device, the encrypted database, from the client device.

12. The method of claim 10, wherein:
sending the encrypted response to the client device includes sending an encrypted table to the client device.

13. The method of claim 10, wherein:
generating the encrypted response to the secure query includes generating the encrypted response without decrypting the secure query and without decrypting the encrypted database.

14. The method of claim 10, wherein:
the encrypted multi-maps include a row-wise multi-map that stores a row-wise representation of the relational database in encrypted form.

15. The method of claim 10, wherein:
the encrypted multi-maps include a column-wise multi-map that stores a column-wise representation of the relational database in encrypted form.

16. The method of claim 10, wherein:
the encrypted multi-maps include a value-wise multi-map that stores a value-wise representation of the relational database in encrypted form, the value-wise representation representing mappings of values of cells to rows in the relational database that store respective values in common with the respective cells.

17. The method of claim 10, further comprising:
based at least on the arity value and the dimension value, instantiating a matrix,
wherein generating the encrypted response includes placing ciphertexts in specific locations in the matrix.

18. A system comprising:
at least one server that includes:
at least one hardware device processor;
an encrypted relational database that includes encrypted multi-maps corresponding to a relational database hosted at a client device, and an encrypted dictionary, the encrypted multimaps and the encrypted dictionary being encrypted using structured encryption in lieu of using property-preserving encryption (PPE) and in lieu of using fully homomorphic encryption (FHE); and
a security controller that includes a computer-readable storage medium storing executable instructions that, when executed, cause one or more of the at least one hardware device processor to control secure processing of queries in the encrypted relational database, the security controller including:
a query controller that receives, from the client device, a secure query in a format of an encrypted token generated using a structured query language (SQL) query in a conjunctive query form, and sends an encrypted response to the secure query to the client device, the query controller including:
a search engine that generates the encrypted response to the secure query by initiating a search on the encrypted relational database, without decrypting the secure query and without decrypting the encrypted multi-maps.

19. The system of claim 18, wherein:
the encrypted multi-maps include a value-wise multi-map that stores a value-wise representation of the relational database in encrypted form, the value-wise representation representing mappings of values of cells to rows in the relational database that store respective values in common with the respective cells.

20. The system of claim 18, wherein:
the encrypted multi-maps include a value-wise multi-map storing an encrypted mapping of a plurality of values of cells to respective tokens for respective rows of the relational database that respectively store the same respective values.

21. The system of claim 18, wherein:
the received secure query includes the encrypted token generated using a structured query language (SQL) query in selection, projection, and Cartesian product (SPC) normal form, using structured encryption, in lieu of using property-preserving encryption (PPE), and in lieu of using fully homomorphic encryption (FHE).

* * * * *